US006208976B1

(12) United States Patent
Kinebuchi et al.

(10) Patent No.: US 6,208,976 B1
(45) Date of Patent: *Mar. 27, 2001

(54) ORDER MANAGEMENT SYSTEM WITH AUTOMATIC MENU UPDATING

(75) Inventors: Tadashi Kinebuchi; Hiroyuki Baba; Masanori Konishi; Akihiro Gomi, all of Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/663,958

(22) Filed: Jun. 14, 1996

(30) Foreign Application Priority Data

Jun. 16, 1995 (JP) .................................................. 7-150619
Jul. 27, 1995 (JP) .................................................. 7-192289
Sep. 22, 1995 (JP) .................................................. 7-269354

(51) Int. Cl.⁷ .............................................................. G08B 5/00
(52) U.S. Cl. .............................. 705/15; 705/210; 705/16; 340/286
(58) Field of Search .................................. 705/21, 15, 16

(56) References Cited

U.S. PATENT DOCUMENTS

| 4,468,750 | * | 8/1984 | Chamoff et al. | 705/21 X |
| 4,547,851 | * | 10/1985 | Kurland | 705/15 |
| 4,553,222 | * | 11/1985 | Kurland et al. | 705/15 |
| 4,851,994 | * | 7/1989 | Toda et al. | 705/1 X |
| 4,992,940 | * | 2/1991 | Dworkin | 364/401 |
| 5,003,472 | * | 3/1991 | Perrill et al. | 705/15 |
| 5,128,862 | * | 7/1992 | Mueller | 705/15 |
| 5,235,509 | * | 8/1993 | Mueller et al. | 705/15 |
| 5,262,938 | * | 11/1993 | Rapoport et al. | 705/15 |
| 5,594,920 | * | 1/1997 | Ebina et al. | 705/24 |
| 5,845,263 | * | 12/1998 | Camaisa et al. | 705/15 |
| 5,890,135 | * | 3/1999 | Powell | 705/16 |
| 5,907,275 | * | 5/1999 | Battistini et al. | 705/15 |

FOREIGN PATENT DOCUMENTS 7-28886   1/1995   (JP) .

OTHER PUBLICATIONS

Microsoft Windows User's Guide. Version 2.0. Microsoft Press. pp. 12–12, 15, 1987.*
Menu–Works Personal User'Guide. Version 2.0. PC Dynamics Inc. pp. 8–1 thru 8–5, 1991.*
Wilson, Linda, "Arby's It: Rare & Well Done", Information Week, (Aug. 16, 1993), p. 49.*

* cited by examiner

Primary Examiner—Tod R Swann
Assistant Examiner—Jagdish N Patel

(57) ABSTRACT

An order management system enables a customer to use a terminal device to order food, but can respond rapidly to changes and additions to the menu. When this system starts up, it transmits an operating program and image data from main management equipment to each of a number of order-taking terminal devices. Each order-taking terminal device stores the thus received operating program and image data and displays a menu screen on a display screen on the basis of the thus stored operating program and image data.

1 Claim, 26 Drawing Sheets

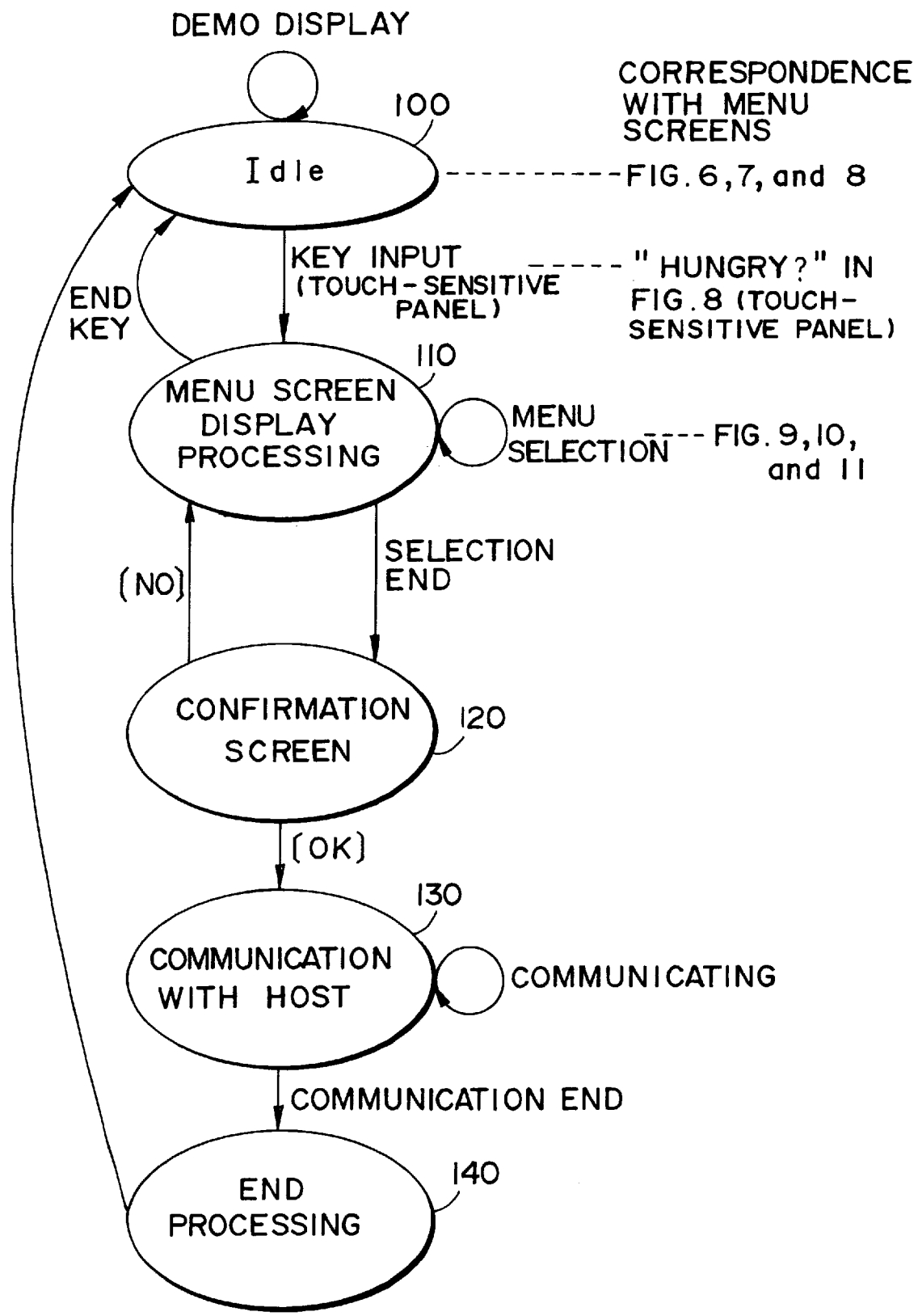

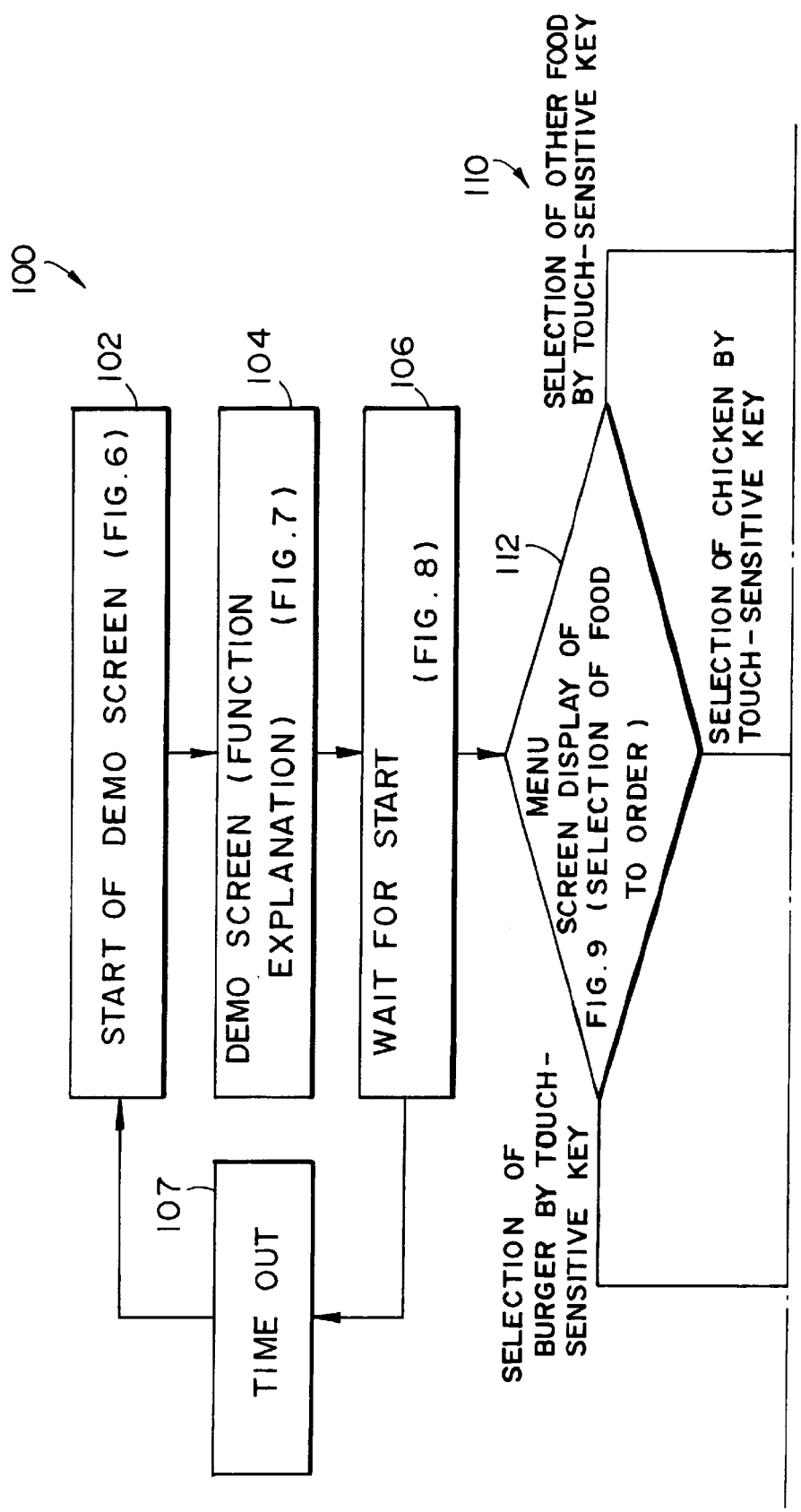

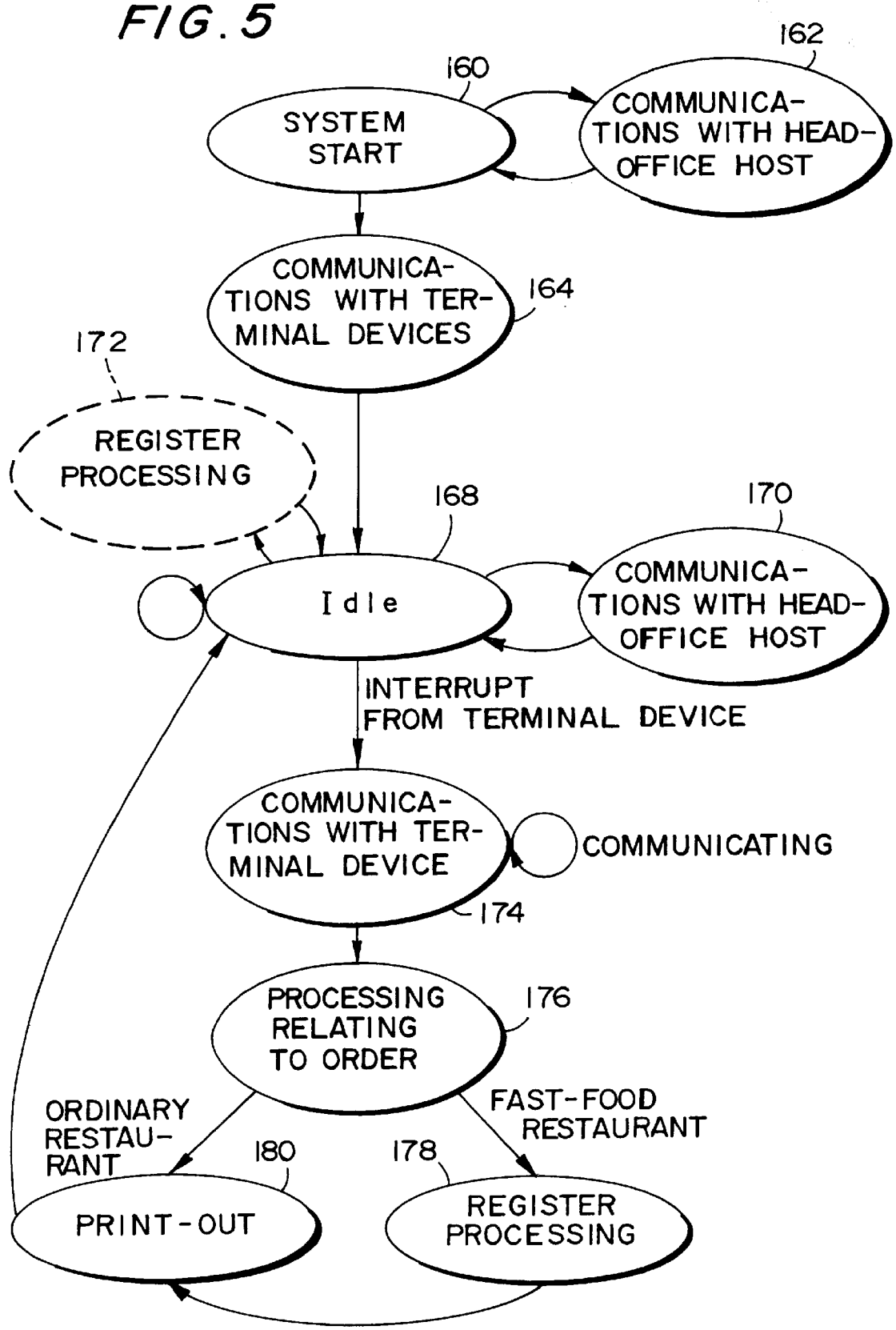

ORDER MANAGEMENT SYSTEM WITH AUTOMATIC MENU UPDATING

BACKGROUND OF THE INVENTION

The present invention relates to an order management system, in particular to an order management system by which a user can transmit order data while viewing a screen on the terminal device.

DESCRIPTION OF THE PRIOR ART

The system generally used for managing orders in a restaurant or the like is such that a waiter or waitress takes each customer's order and conveys it to the kitchen. However, an order management system of this type has a problem in that the expenses involved in employing waiting staff increases the unit price of the food.

In establishments such as fast-food restaurants that have recently become common, a system is used in which the customer has to approach a counter to order and again to pick up the ordered food. However, an order management system of that type has a problem in that it places a large burden on customers because they have to return to the counter every time they order, and they have to wait in line at the counter if the restaurant is busy.

In order to solve these problems, the use of an order management system has been considered in which a main piece of management equipment for order management (a host computer) is combined with a plurality of terminal devices for ordering that are provided at the customers' tables. Since this order management system makes it possible for a customer to make an order while viewing image data for ordering that is displayed on a terminal device, and the resultant order can be processed by the main management equipment, it can solve both of the previously mentioned problems concerning staff expenses and the load on the customers.

Unfortunately, it is not possible for a customer to obtain a good visualization of the dishes available for order, simply from an order list displayed on a terminal device. In such a case, a problem occurs in that customers become reluctant to use this system to order food.

One method that can be considered for solving this problem is to display a menu screen that shows images of completed dishes. This enables customers to instantly comprehend the contents of the menu in a visual fashion, so that they can order dishes accurately. However, a further problem arises in this case in that the if data such as image data and an image reproduction program is transferred every time an order is passed between the management equipment and the terminal devices, the quantity of data that must be handled becomes too large and thus it is no longer possible for ordering to proceed smoothly.

In order to solve this problem, image data for ordering and an associated operating program could be previously stored in ROM within each of the order-taking terminal devices. However, if the menu of the restaurant changes with such a configuration, the ROM in each terminal device has to be replace with a new ROM containing the image data and operating program, giving rise to a problem in that it is not possible to respond rapidly to changes or additions to the menu.

A particular problem with a restaurant or the like is the fact that the menu has to be modified frequently for reasons such as the availability of ingredients, so there is a demand for the development of an order management system that can respond rapidly to such changes.

SUMMARY OF THE INVENTION

An objective of the present invention is to provide an order management system which enables a customer to use a terminal device to place an order, while responding rapidly to changes in the data for order management such as the menu.

In order to achieve the above objective, a first aspect of the present invention relates to an order management system comprising:

main management equipment for order management; and
a plurality of terminal devices connected to the main management equipment by lines;
wherein the main management equipment, comprises:
first storage means for storing image data for an order management screen created for the terminal device and an operating program for reproducing the image data in accordance with predetermined rules and managing data transmission for order management;
first control means for transmitting the image data and the display operating program to the terminal devices when the system starts up; and
order management means for managing orders from the terminal devices based on first data for order management received from the terminal devices;
wherein the terminal device, comprises:
second input means;
second storage means;
display means; and
computation control means for forming images and providing order management;
wherein the computation control means, comprises:
data write means for writing the received display operating program and image data into the second storage means for storage;
image displaying means for reading the image data from the second storage means based on the stored operating program, and displaying an order management screen on the display means; and
second control means for transmitting to the main management equipment an order input from the input means in response to the order management screen as the first transmission data based on the stored operating program, so that a user can place an order while viewing the order management screen.

With this configuration, the order management system of the present invention transmits data from the main management equipment to each of the terminal devices at system start-up. This data is image data for an order management screen and an operating program for reproducing the image data in accordance with predetermined rules and managing data transfer for order management. Each terminal device then stores the thus received image data and operating program in the first storage means.

Since new image data and an operating program is stored in each terminal device when the system starts up, the system can respond rapidly to updates to the list of products that can be ordered.

In accordance with the present invention, the order management screen is displayed on the display means of the terminal devices after the system has started up. Thus a user can visually verify the details of order data and the procedure required for transmitting this data, for example.

The user can input orders in response to the order management screen. The thus-input order data is sent as the first transmit data to the main management equipment.

From the above description, it is clear that the terminal device of the system in accordance with this aspect of the invention displays the screens relating to the data to be transmitted. Thus the user can check the details of the data to be ordered and the operating sequence for ordering this data in a visual, easy-to-understand manner, and thus the system is extremely convenient to use.

Moreover, the image data itself is not transmitted during order data transfer, only data relating to that image data is transmitted, and the quantity of data transferred is small and thus the data can be transmitted rapidly.

In a second aspect of the present invention:
the second input means is a touch-sensitive panel disposed on the display means in a predetermined mutual relationship with the order management screen.

This configuration enables the user to input order data by simply touching an order screen displayed on the screen, making it possible to provide a terminal device that is extremely easy to operate.

In a third aspect of the present invention:
the second storage means stores image data for an order menu screen as the order management screen; and
each of the terminal devices is disposed at a customer's seat so that a customer can place an order while viewing a menu screen displayed on the display means.

This configuration in which order-taking terminal devices are provided at customers' seats and a menu screen is displayed as an order screen on each display means makes it possible for customers to order directly from their own seats while viewing a menu screen, without having to stand in line at a counter.

In particular, the system in accordance with the present invention ensures that ordering can be done smoothly even when the restaurant is crowded, and the load on the customer caused by ordering is reduced.

In a fourth aspect of the present invention:
the order management means of the main management equipment transmits interactive data corresponding to received first data as second data to the corresponding terminal device; and
the terminal device displays the contents of the second data on the display means.

With this configuration, the main management equipment receives the first data from the terminal device and thereupon transmits interactive data corresponding to that first data as second data back to the terminal device. Thus each terminal device transfers interactive data to and from the main management equipment, enabling the terminal device to receive necessary data.

The system of this aspect of the invention enables the interactive transfer of data, in a manner that is easy for the user to understand and requires little data.

In a fifth aspect of the present invention:
the main management equipment further comprises first input means for inputting a notification that a product which has been ordered is ready;
the order management means transmits input data from the first input means as second data to the corresponding terminal device; and
the terminal device uses the image displaying means to display a message stating that the ordered product is ready on the display means, when the second data is received.

In a sixth aspect of the present invention:
the order management means of the main management equipment transmits information specified by the first data as second data to the corresponding terminal device; and
the terminal device uses the image displaying means to display the second data on the display means.

With this configuration that displays a message stating that the ordered product is ready on the order-taking terminal device, customers can relax in their own seats until the products they have ordered are ready. This makes it possible to implement an order management system that enables smooth management of the entire process from order acceptance to delivery, particularly when the restaurant is crowded.

Moreover, in accordance with the present invention, this use of a configuration by which an order for desired information is transmitted from an order-taking terminal device to the main management equipment as first data, whereupon the main management equipment transmits the information specified by that first data back to the terminal device as second data, makes it possible for customers to be informed of desired information while they remain in their own seats.

In particular, the terminal device of the present invention could be provided at a customer's seat at an entertainment site such as a sports ground, baseball stadium, or theater, so that the customer can use the system to obtain information about a specific player or team, or an actor, without leaving that seat.

Providing a terminal device of this type at each seat in a restaurant at an amusement park or the like makes it possible for customers to ask the main management equipment for information concerning events and underemployed facilities, without leaving their seats. Thus customers can enjoy these events and facilities while minimizing the waiting time required for the facilities.

In a seventh aspect of the present invention:
each of the terminal devices is provided at a customer's seat at one of sports ground, baseball stadium, and theater; and the main management equipment manages orders from customers' seats and instructs a vendor to deliver an ordered product.

The provision of an order-taking terminal device at a customer's seat at a baseball stadium or theater in this manner makes it possible for a customer who is engrossed in the action but who wants to drink something such as juice to order that juice in a simple manner from that seat, without having to shout to attract the attention of a vendor in the conventional manner.

In an eighth aspect of the present invention:
the image data is image data for an order management screen wherein at least part of the data is presented as a dynamic image.

Thus the system in accordance with the present invention represents part of the order management screen that is displayed on the terminal device as a dynamic image. This makes it possible to use a dynamic animation or cartoon character to present the user with information such as details of the order or the procedure for ordering, visually and in an easy-to-understand form. The result is an order management system that is easy for the user to input orders.

In a ninth aspect of the present invention:
the image data is image data for an order menu screen representing a plurality of ordering categories as the order management screen; and
the terminal device enables the ordering of any category while viewing the menu screen.

Displaying the order management screen as a menu screen in this manner makes it possible to implement a terminal device that is even more convenient to use.

In this regard, it is preferable that managemental details, such as images of dishes, are displayed on the menu screen by using readily understandable animations or photographs.

In a tenth aspect of the present invention:
the image data is image data for an order menu screen representing a plurality of ordering categories as the order management screen; and
the second control means transmits any ordering category selected by the second input means to the order management equipment as the first data.

This aspect of the invention enables the order input by the user by simply selecting a desired ordering category of the order menu screen displayed on the terminal device. Thus it is possible to implement a system that is extremely convenient to use.

In an eleventh aspect of the present invention:
one of the first and second data is transferred as code data.

This configuration makes it possible to reduce the quantity of data that is transferred between each terminal device and the main management equipment and thus enable the data to be transferred efficiently.

In particular, this aspect of the system in accordance with the present invention displays an order management screen on each terminal device, enabling a user to use an easy-to-understand, accurate ordering procedure while viewing this screen. Moreover, the quantity of data that is transferred in accordance with this ordering procedure can be greatly reduced. Thus the present invention makes it possible to obtain an order management system that can simultaneously satisfy conflicting requirements for an easy-to-understand operating procedure and a reduced quantity of data to be transferred.

In a twelfth aspect of the present invention:
the terminal device transfers a plurality of sets of the image data and associated display operating programs for storage in the second storage means, and performs ordering control based on any selected set of image data and associated display operating program.

In a thirteenth aspect of the present invention:
the second control means performs ordering control based on remaining sets of image data and operating program during a waiting time during which ordering is being controlled based on a predetermined set of image data and operating program.

In accordance with this aspect of the system of the present invention, another order management operation can be performed during the waiting time of a predetermined order management operation, so that the user can make use of the waiting time to order effectively.

In a fourteenth aspect of the present invention:
the second storage means stores a plurality of sets of the image data and associated display operating programs for product ordering and information ordering; and
second control means performs information ordering during a waiting time for product ordering being controlled.

It often happens that the time required to transfer an order for information through a circuit and receive that information is shorter that the time taken between placing the order for a dish until the food is ready. This aspect of the invention makes use of the waiting time that occurs when a product such as a food dish is being ordered, between the ordering of the dish and the time that the food is ready, to provide ordering control for information. This ensures that the user does not waste this waiting time, and can use it efficiently to obtain other information.

In a fifteenth aspect of the present invention:
the image data displays a hierarchical menu screen representing a plurality of ordering categories as the order management screen.

The use of hierarchical menus in this manner makes it possible to utilize a limited display space efficiently and display screens that are easy for the user to understand.

In a sixteenth aspect of the present invention:
the image data includes information divided into a number of major categories according to type, items belonging to each of the major categories further divided into a tree structure within that major category, so as to display order management menu screens in a hierarchy; and
the operating program displays a menu screen representing items in a level next to a hierarchical level corresponding to one of root and node portions of the displayed tree structure, the next level belonging to a category selected by a user from categories of the hierarchical level, and the operating program switches menu screens representing each of items belonging to a same leaf portion of the tree structure to display a menu screen based on screen changing order from the second control means.

In a seventeenth aspect of the present invention:
display contents of each item belonging to a hierarchical level corresponding to the one of root and node portions is an image acting as an index representing the contents of the item, at least parts of the index data function as icons; and
the image displaying means displays a menu containing the item corresponding thereto when one of the icons is selected by means of the input means.

Displaying parts of the menu screen as icons in this manner makes it possible to provide an input operation that is even more convenient for the user to use.

In an eighteenth aspect of the present invention:
the image displaying means identifies and displays a selected icon and a non-selected icon.

Displaying highly recognizable icons in this manner makes it possible to provide the user with an accurate input operation.

In a nineteenth aspect of the present invention:
the image displaying means displays a display change area on a screen and switches the image which is displayed when the display change area is selected by the input means, so as to display items corresponding to a leaf portion of the tree structure.

This makes it possible to switch smoothly between hierarchical menu screens.

In a twentieth aspect of the present invention:
the image displaying means displays explanatory information for explaining details of information displayed on a display screen to overlay the display information with the explanatory information, and causes the explanatory information to move so that the contents of the display information in the overlaid area are recognizable.

In other words, at least part of the order management screen in the terminal device of the present invention is presented as a dynamic image. When explanatory information for explaining details of information displayed on the display screen is presented as a dynamic image that overlays the information on the display screen in this manner, it is preferable that the explanatory information is made to move to ensure that the display information in the overlaid area can be seen. This makes it possible to provide an image display that is even easier for the user to understand.

BRIEF DESCRIPTION OF THE DRAWINGS

FIG. 3 is a flowchart of the operation of the order-taking terminal device;

FIGS. 4A and 4B are detailed flowcharts of the operation of the order-taking terminal device; FIG. 4 consists of FIGS. 4A and 4B;

FIG. 5 is a flowchart of the operation of the on-site POS system;

DESCRIPTION OF PREFERRED EMBODIMENTS

Figure 1:
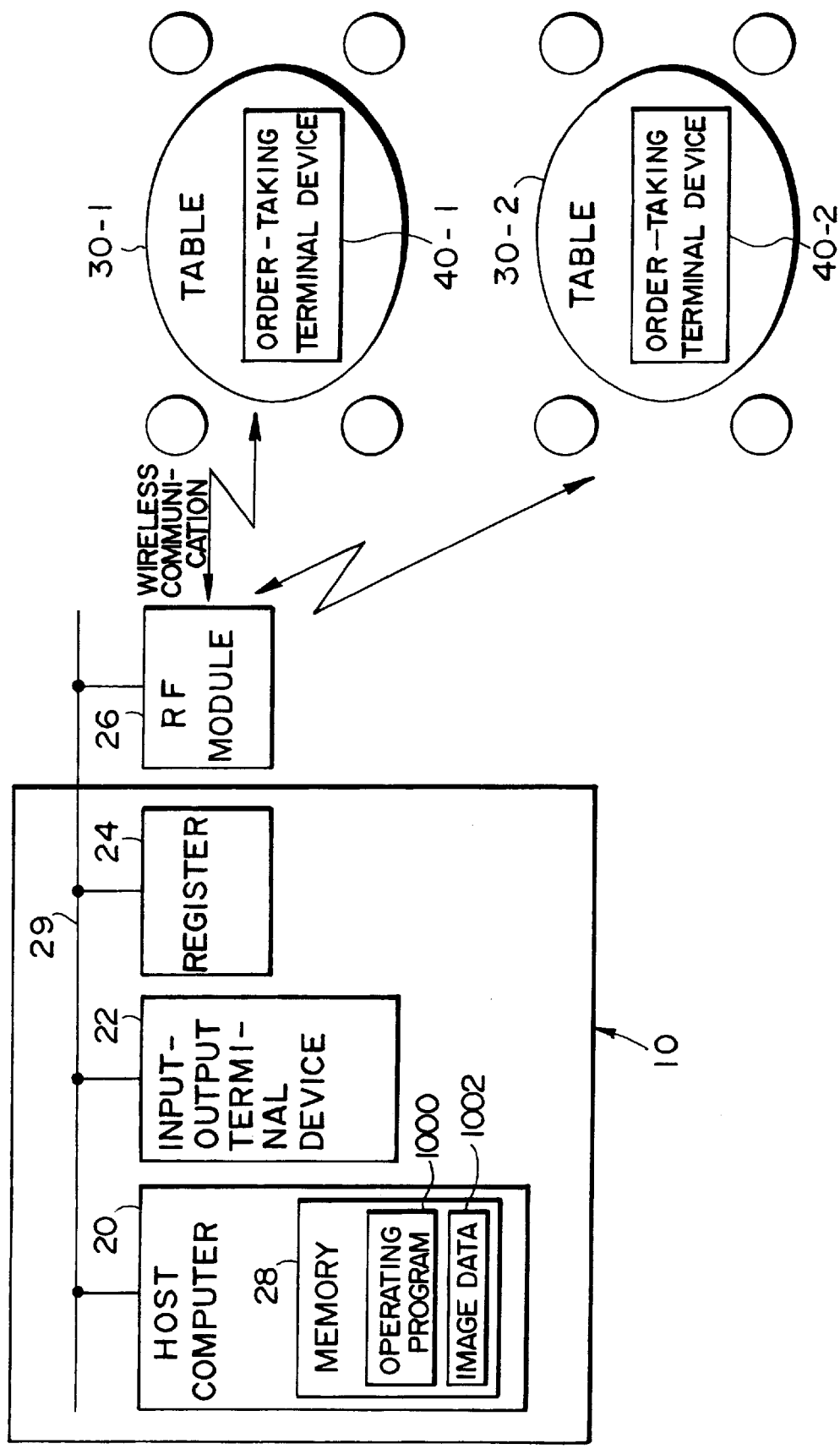
FIG. 1 is an explanatory view of the order management system of a preferred first embodiment of the present invention.

Preferred embodiments of the present invention will now be described with reference to the accompanying drawings.
First Embodiment A first preferred embodiment of the present invention is shown in FIG. 1. This order management system controls orders at a restaurant located at a site such as an amusement park. Specifically, it is configured to comprise an on-site (i.e., installed at the restaurant) point-of-sales (POS) system with main management equipment 10 for order management and a plurality of order-taking terminal devices 40-1, 40-2 located on each of the tables 30-1, 30-2 of the restaurant.

This on-site POS system 10 is connected by a line 29 to a host computer (not shown in the figure) at the head office of the restaurant chain that handles all of the restaurants. A network is configured of the head-office host computer and a host computer 20 at each restaurant.

The POS system with main management equipment 10 is configured to comprise the host computer 20, an input-output terminal device 22 that functions as an input-output means, and a register 24 that keeps track of all money transactions. This POS system 10 uses an RF module 26 as a relay terminal to keep in contact with the order-taking terminal devices 40-1, 40-2 on the tables 30-1, 30-2 within the restaurant.

The host computer 20 is configured to comprise a memory 28. Programs that enable the on-site host computer 20 to function as the main management equipment for order management are stored in this memory 28.

In addition, an operating program 1000 and image data 1002 for order screens are stored in the memory 28 for the order-taking terminal devices 40-1, 40-2. That is to say, this memory 28 also functions as storage means for data to be transferred to the terminal devices 40-1, 40-2.

In this case, the operating program 1000 and image data 1002 are generated to enable order management of the food served at this restaurant.

The operating program 1000 and image data 1002 for order screens that are stored in the memory 28 are read out when the system starts up, then are transferred to each of the order-taking terminal devices 40-1, 40-2 via the RF module 26.

When an order is placed from one of the order-taking terminal devices 40-1, 40-2, the on-site POS system 10 temporarily stores details of that order in the memory 28 and also outputs a printout of the order from the input-output terminal device 22. If this restaurant is a fast-food restaurant, when an order is received, details of that order are processed at the register 24 to compute the bill, then those details are output as a printout from the input-output terminal device 22.

When the ordered food has been prepared, the restaurant staff inputs notice data that the ordered food is ready to the on-site POS system 10 by means of the input-output terminal device 22. When this input is performed, the host computer 20 sends an order-ready message to one of the order-taking terminal devices 40-1, 40-2 on the corresponding table 30-1, 30-2, as second data.

When an order for information is input from one of the order-taking terminal devices 40-1, 40-2, as will be described later with reference to a second embodiment of the present invention, the on-site POS system 10 temporarily stores the contents of that order in the memory 28. If the ordered information is already in the memory 28, that information is transferred as second data to the appropriate order-taking terminal device 40-1, 40-2. If the ordered information is not already in the memory 28, the POS system 10 asks the head-office host computer (not shown in the figure) for the required information, and that information is transferred as second data to the appropriate order-taking terminal device 40-1, 40-2.

Figure 2:
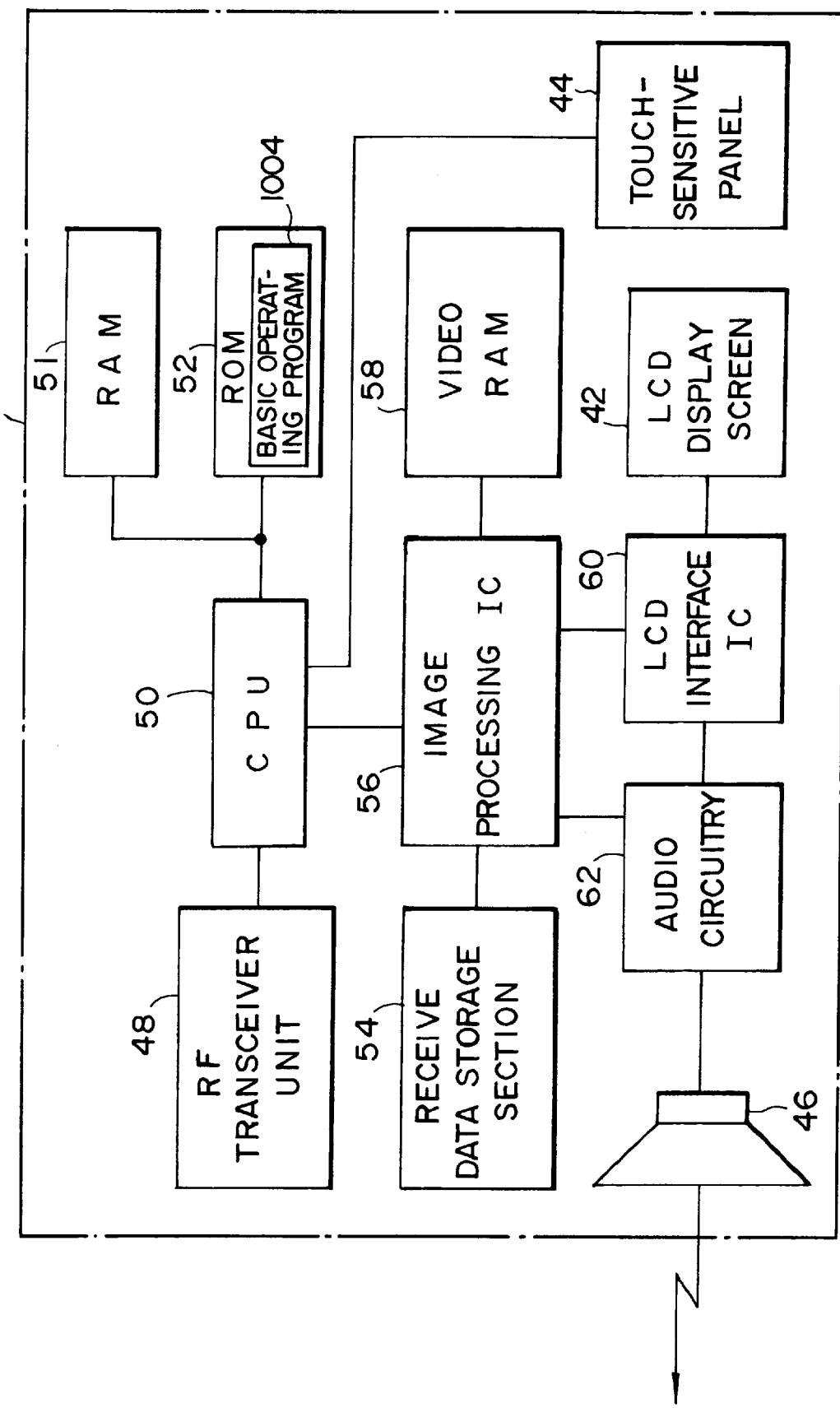
FIG. 2 is a functional block diagram showing the specific configuration of the order-taking terminal device in the system of FIG. 1.

The configuration of each of the order-taking terminal devices 40-1, 40-2 that is placed on each table is shown in FIG. 2. These order-taking terminal devices 40-1, 40-2 comprise a liquid crystal display screen 42 and a transparent touch-sensitive panel 44 placed on this display screen 42, and are configured in such a manner that a customer can operate the touch-sensitive panel 44 while viewing order screens displayed on the display screen 42. These order-taking terminal devices 40-1, 40-2 are also provided with a speaker 46 configured in such a manner that messages such as those relating to the operating sequence and order confirmation messages can be output audibly therefrom.

The configuration is such that the inputting of an order is facilitated by the touch-sensitive panel 44, whereby touch sensors are arranged in a predetermined mutual relationship with the products that can be ordered on the order menu screen that is displayed on the screen 42.

These order-taking terminal devices 40-1, 40-2 are configured to comprise an RF transceiver unit 48, a CPU 50, RAM 51, ROM 52, a receive data storage section 54, an image processing IC 56, and video RAM 58. The image processing IC 56 is configured to display an order screen on the display screen 42 via the LCD interface IC 60 and also to output audio signals from the speaker 46 via audio circuitry 62.

These order-taking terminal devices 40-1, 40-2 are also configured to transmit and receive data through a wireless communications circuit formed between the RF transceiver unit 48 and the RF module 26 of FIG. 1.

A basic operating program 1004 is stored as firmware in the ROM 52 to provide basic control over the entire apparatus. This basic operating program 1004 is configured to control the entire apparatus on the basis of data such as inputs from the touch-sensitive panel 44, and also control functions such as the transfer of data to and from the POS system with main management equipment 10. This basic operating program 1004 also comprises a program for writing the image data 1002 and operating program 1000 received from the host computer 20 into the receive data storage section 54.

When the order-taking terminal device 40-1, 40-2 receives the operating program 1000 and image data 1002 for order screens from the on-site POS system with main management equipment 10 at start-up, the CPU 50 writes the received operating program 1000 and image data 1002 into the receive data storage section 54 on the basis of this basic operating program 1004. In other words, the CPU 50 functions as a data write means.

In this case, the receive data storage section 54 could be configured by using various different types of writable memory. For example, it could be configured by using graphics memory, SRAM, PSRAM, flash memory, or a hard disk, as required.

The operating program 1000 stored in the receive data storage section 54 is basically configured as programs that display image data 1002 in accordance with predetermined rules and also send and receive data 1002 for order management.

The image data of this embodiment is configured of data for a plurality of menu screens in a hierarchical structure, with data for each of these menu screens being stored beforehand at predetermined addresses. In order to display the contents of the menus in an easy-to-understand form on the menu screens, the configuration is such that a cartoon character (a "Mr. Fork" 300, as will be described later) appears as a dynamic image on each screen. Data for this cartoon character information is also stored at predetermined addresses. Note that the receive data storage section 54 is used actively as a character generator. In order to enable several cartoon characters to move freely on the screen, data for a plurality of cartoon characters could be pre-stored in the storage section 54 as part of the image data 1002.

It should also be noted that each of these menu screens and the cartoon character data comprises both written captions and audio data.

The image processing IC 56 reads out image data from the receive data storage section 54 in accordance with control commands from the CPU 50 and the operating program 1000 stored in the receive data storage section 54. It then puts together screen data for the menu screen and writes it to the video RAM 58, and also displays the screen data stored in the video RAM 58 on the screen 42, via the interface IC 60.

In other words, in the terminal device of this embodiment, the CPU 50 performs predetermined computations for control on the basis of the basic operating program 1004 and the operating program 1000 stored in the receive data storage section 54, then outputs the computed control codes to the image processing IC 56.

If, for example, a user doesn't input anything through the touch-sensitive panel 44, a control code representing that fact is input to the image processing IC 56. This causes the image processing IC 56 to put together a first-level menu screen from amongst the plurality of menu screens in the hierarchy and display it on the screen 42.

If the user does input something through the touch-sensitive panel 44, the CPU 50 outputs the corresponding instruction as a control configuration to the image processing IC 56. This causes the image processing IC 56 to put together image data that is stored in the receive data storage section 54 in accordance with the operating program 1000 and display it on the screen 42.

That is to say, when a user selects certain information from the touch-sensitive panel 44, the CPU 50 outputs a control signal to the image processing IC 56 on the basis of the resultant signal from the touch-sensitive panel 44. The image processing IC 56 reads out information from the receive data storage section 54 on the basis of the control signal, and displays the read-out contents on the screen 42. If there is audio data available, it also outputs this audio data from the speaker 46 via the audio circuitry 62. Thus a display and audio output is performed to correspond to the order selected by the user through the touch-sensitive panel 44.

The distinctive characteristic of this embodiment lies in the manner in which an operating program 1000 and image data 1002 that are stored in the receive data storage section 54 of an order-taking terminal device 40-1, 40-2 is sent from the on-site POS system with main management equipment 10 when the order management system starts up. This ensures that the order management system can respond rapidly to variations such as changes and additions to the menu.

Figure 12:
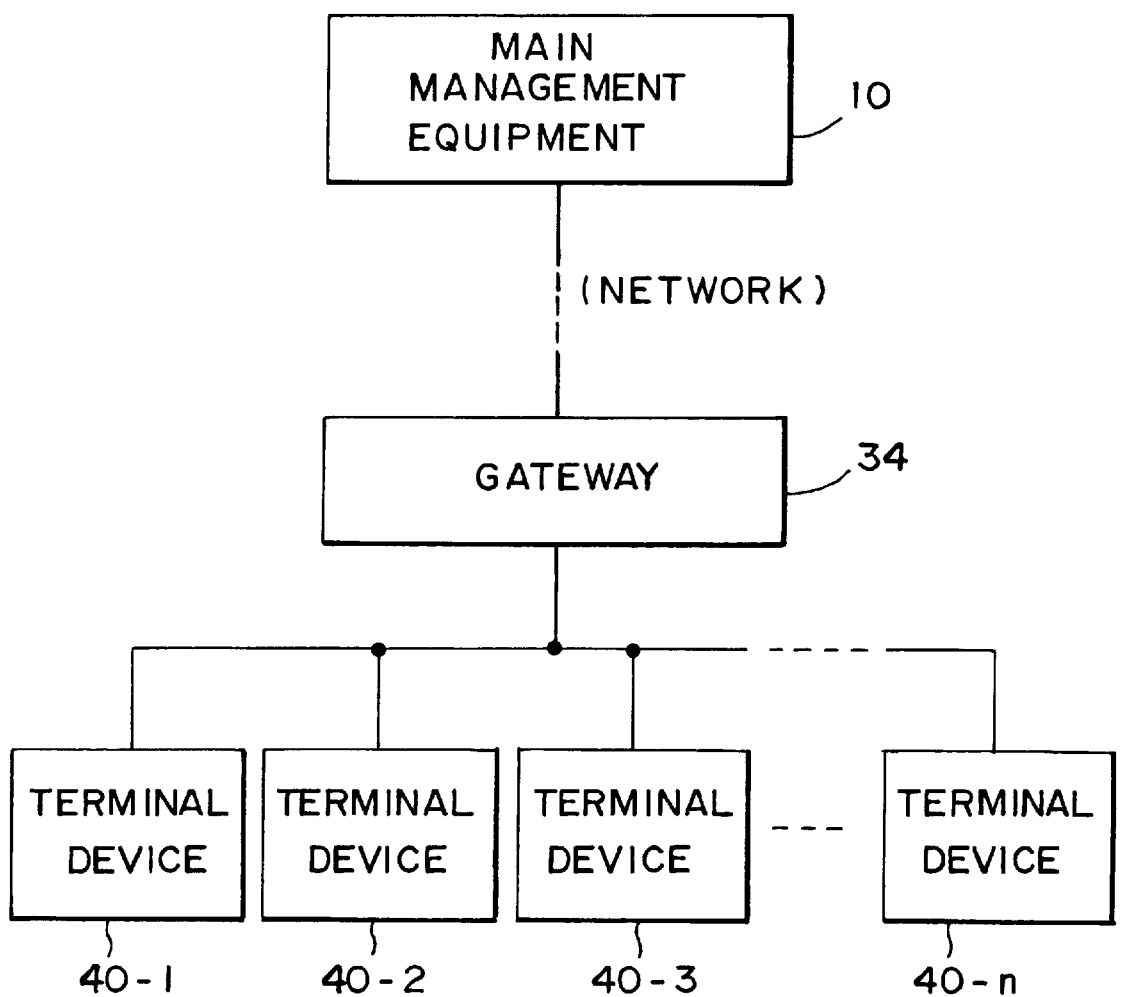
FIG. 12 is an explanatory view of the order management system of another embodiment of the present invention.

Note that, although the on-site POS system with main management equipment 10 and the order-taking terminal devices 40-1, 40-2 in the system shown in FIGS. 1 and 2 were described by way of example as being connected by wireless communications circuitry, other configurations could be considered such as one in which the on-site POS system with main management equipment 10 and the order-taking terminal devices 40-1, 40-2 are connected via a gateway 34 provided on a network, as shown in FIG. 12. In such a case, this gateway 34 acts as an interface between the terminal devices 40-1, 40-2, 40-3 . . . 40-n, the network, and the main management equipment 10.

Figure 13:
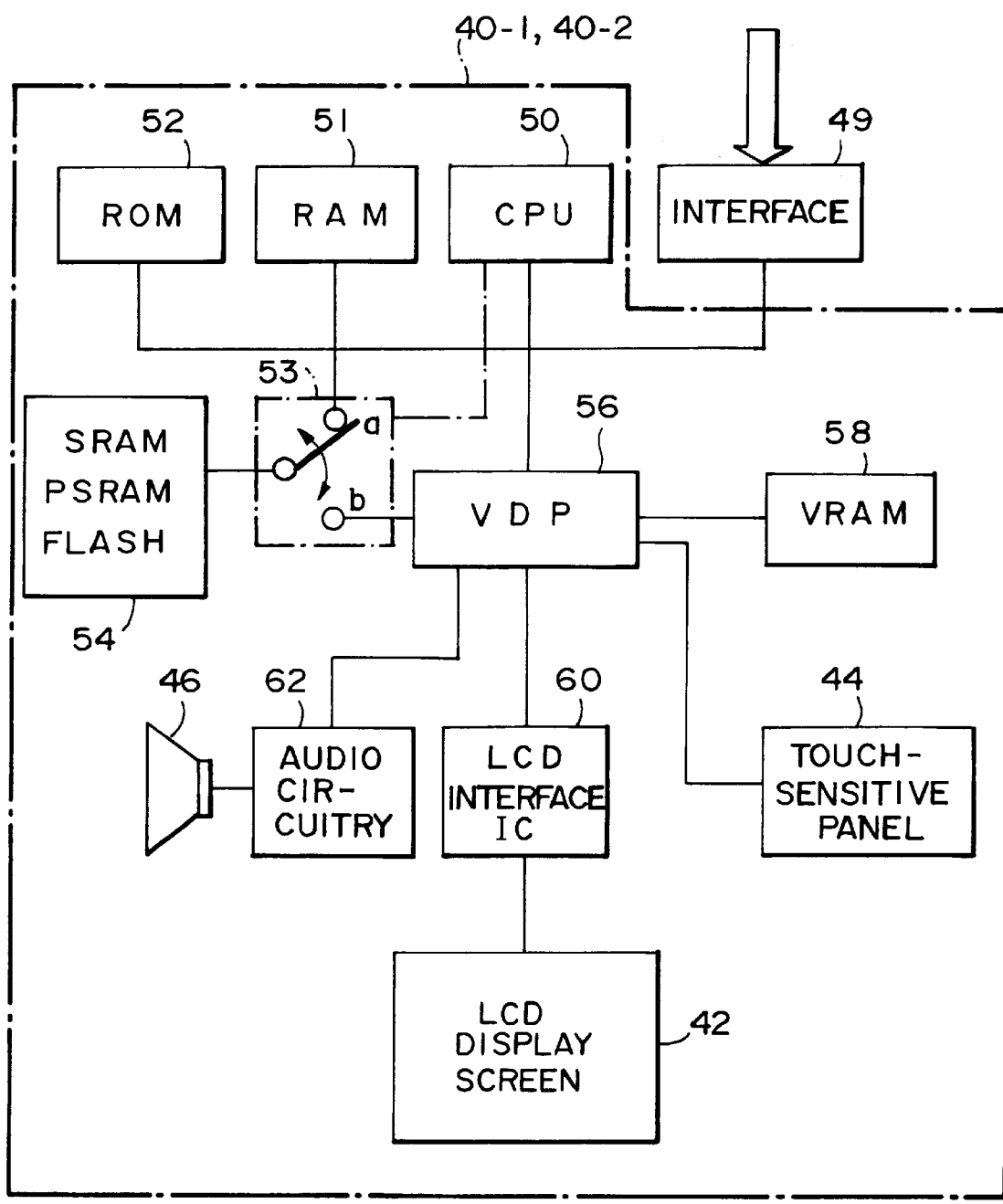
FIG. 13 is a functional block diagram of the terminal device used in the order management system of FIG. 12.

An example terminal device 40-1, 40-2 used in this case is shown in FIG. 13. Note that components corresponding to those in the terminal device of FIG. 2 are given the same reference numbers and further description thereof is omitted.

As will be described later, the CPU 50 functions as a data write means. When image data 1002 and operating program 1000 that are sent from the on-site POS system with main management equipment 10 are received through an interface 49, a switch 53 is controlled to switch to a side a for a write mode and the thus received data is written to the receive data storage section 54 for storage therein.

The configuration is such that, when this write ends, the switch 53 is controlled to switch to a side b for a read mode, and a sequence of order management actions occurs on the basis of the written image data 1002 and operating program 1000.

Figure 4B:
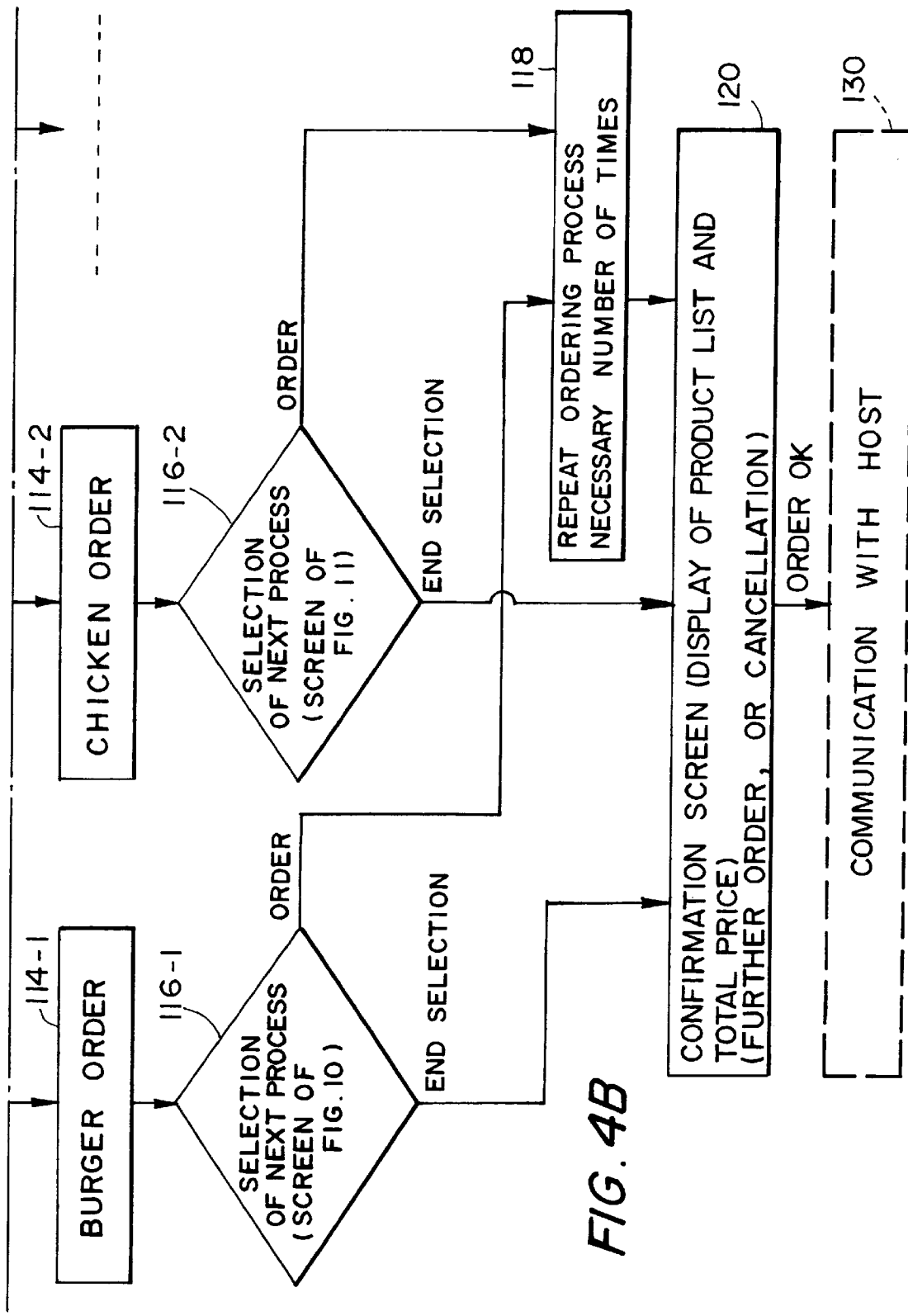

Flowcharts of the detailed operation of the order-taking terminal devices 40-1, 40-2 of the embodiment are shown in FIGS. 3 and 4. FIG. 4 consists of FIGS. 4A and 4B.

The order-taking terminal device 40-1, 40-2 is always set to an idle state when the system starts up, as shown in FIG. 3 (step 100). During this idle state (step 100), the operation cycles through steps 102, 104, 106, and 107 shown in FIG. 4 at fixed intervals.

Figure 6:
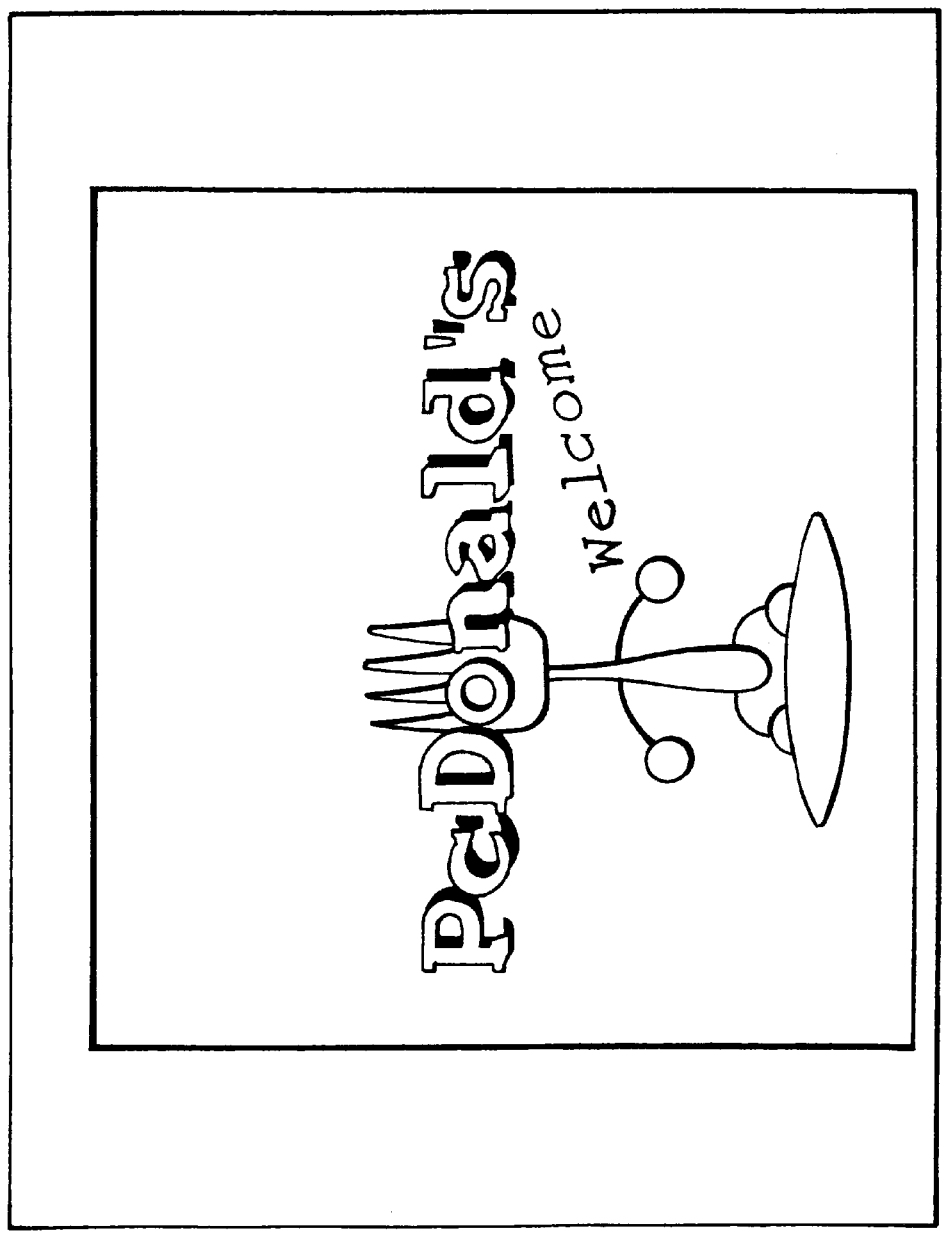
FIG. 6 is an explanatory view of a demonstration screen showing a restaurant's logo on an order-taking terminal device.

In step 102, a demo screen such as that of the restaurant's logo is shown on the display screen 42 for a fixed time, as shown in FIG. 6.

Figure 7:
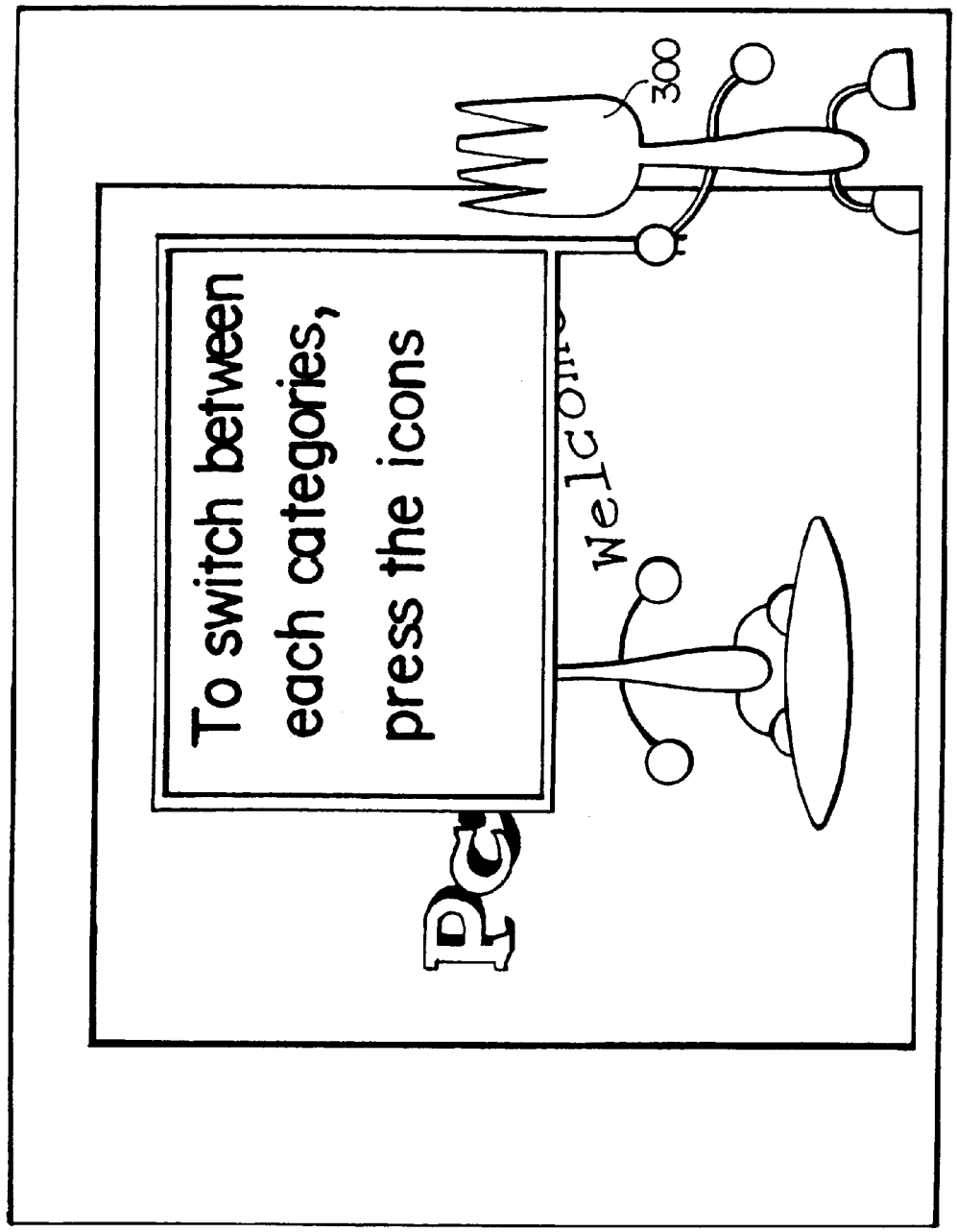
FIG. 7 is another explanatory view of a demonstration screen showing system functions on an order-taking terminal device.

In step 104, a demo screen used for explaining the functions of the system is displayed as shown in FIG. 7. At this point, a cartoon character called Mr. Fork 300 appears. This Mr. Fork 300 moves around the screen and describes the operation of the various screens both in writing and audibly.

Figure 8:
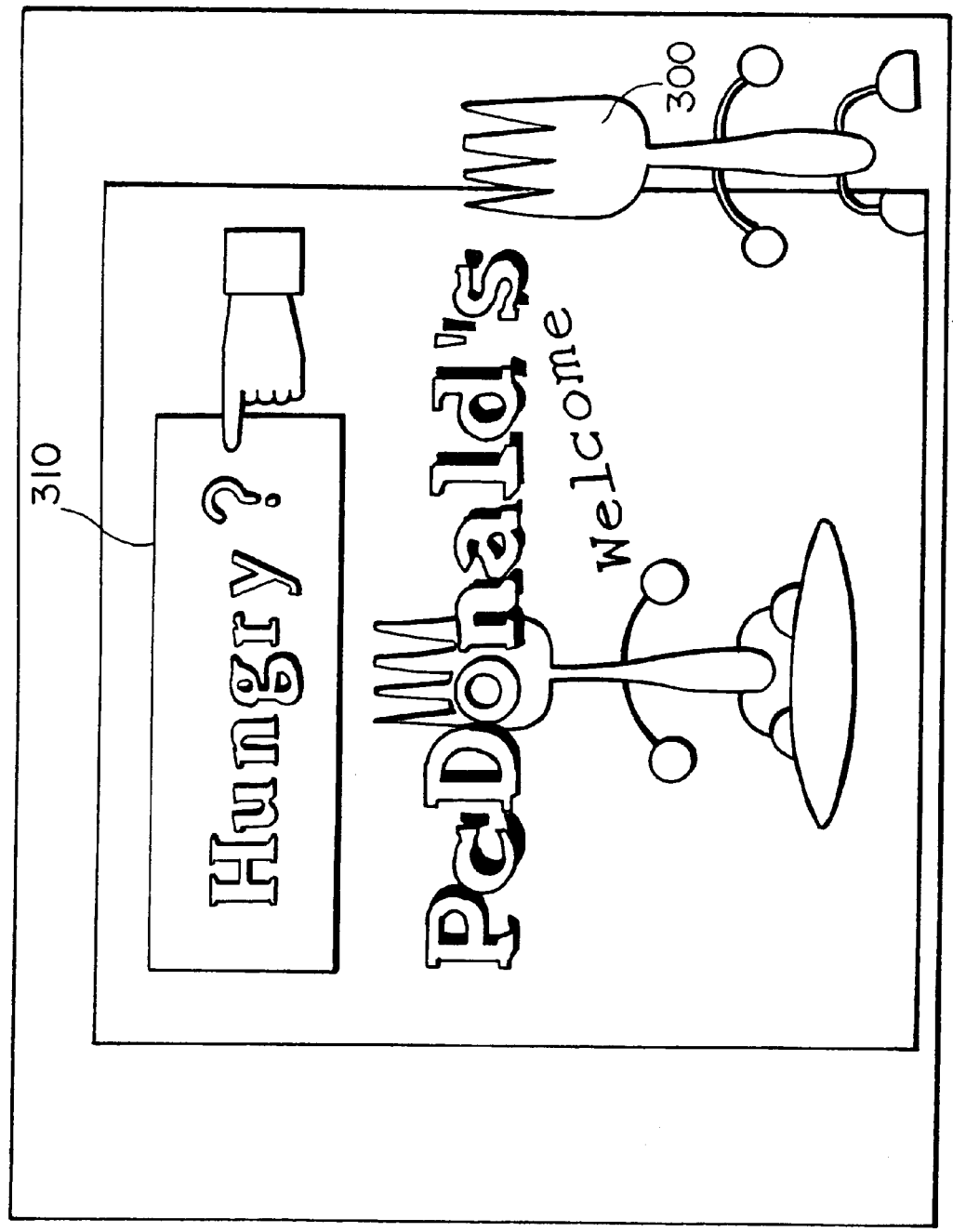
FIG. 8 is yet another explanatory view of a demonstration screen showing a customer prompt on an order-taking terminal device.

Next, in step 106, an order-taking demo screen appears as shown in FIG. 8. Mr. Fork prompts the customer to press the "Hungry?" display area (or rather, a touch sensor provided over the "Hungry?" display area) 310. If the "Hungry?" display area 310 is not pressed within a fixed time, a time-out occurs (step 107) and the sequence of steps 102 to 106 is repeated.

If the customer did touch the "Hungry?" display area 310 during step 106, the flow proceeds from the idle state of step 100 to a menu screen display processing state of a step 110. This step 110 comprises steps 112, 114, 116, and 118 of FIG. 4.

Figure 9:
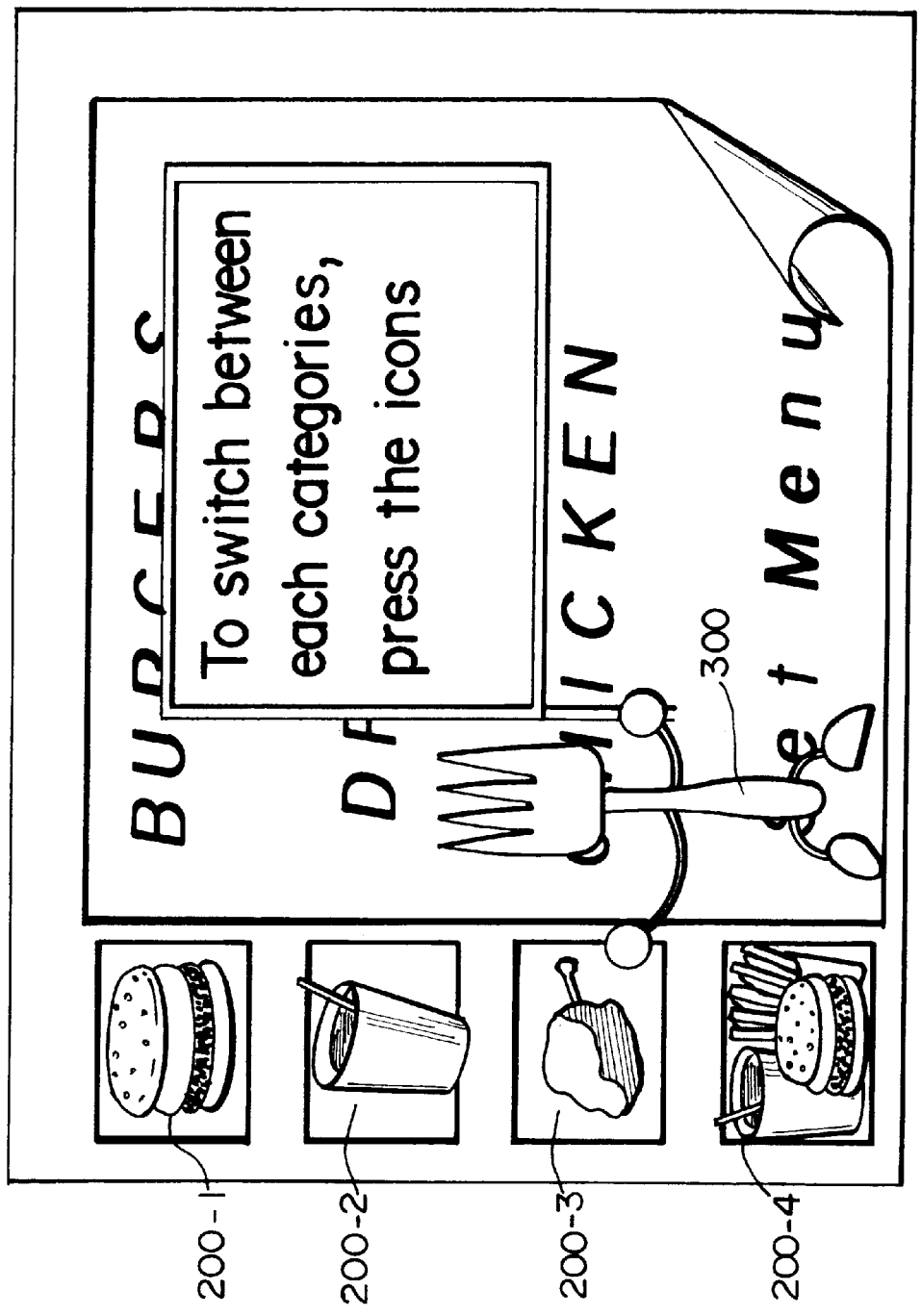
FIG. 9 is an explanatory view of the menu screen of the order-taking terminal device.

First of all, in step 112, the menu screen shown in FIG. 9 appears on the display screen 42. In this menu screen, Mr. Fork 300 describes lists 200-1, 200-2, 200-3, and 200-4 of four types of food that can be ordered. If the customer presses one of the display areas of these lists 200-1 to 200-4, a selection signal for that type of food is input from a touch sensor provided over that portion (step 112).

Figure 10:
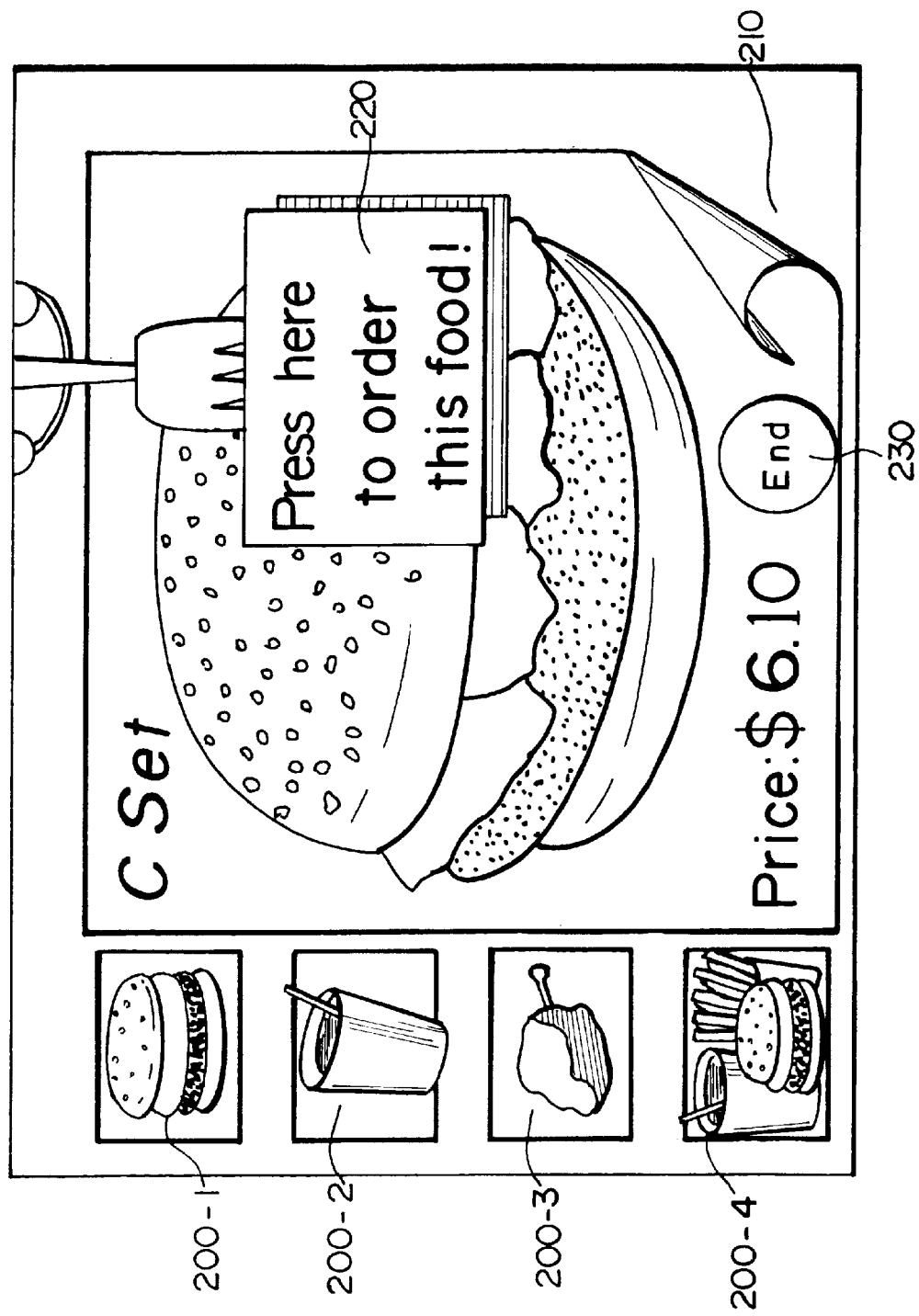
FIG. 10 is another explanatory view of the order screen of the order-taking terminal device.

Assume that the display area over the burger food list 200-1 has been touched. In that case, a menu screen for ordering burgers appears on the display screen 42, as shown in FIG. 10. Of the frames around the food display areas 200-1 to 200-4 down the left side of this screen, only the area 200-1 changes color to identify it, to indicate that the burger menu screen is currently displayed (step 114-1).

If a number of types of burger are available for ordering, a page-turning area 210 is also displayed at the bottom right corner of the screen to enable the customer to see the next burger menu screen by touching this area 210.

In each of these menu screens, a price is displayed along the bottom of the screen. When a burger appears that the customer would like to order, he or she can touch an order area 220 on the screen. This ensures that a burger selection signal corresponding to a touch sensor provided at a position over this area 220 is input to the CPU 50 (step 116-1).

Figure 11:
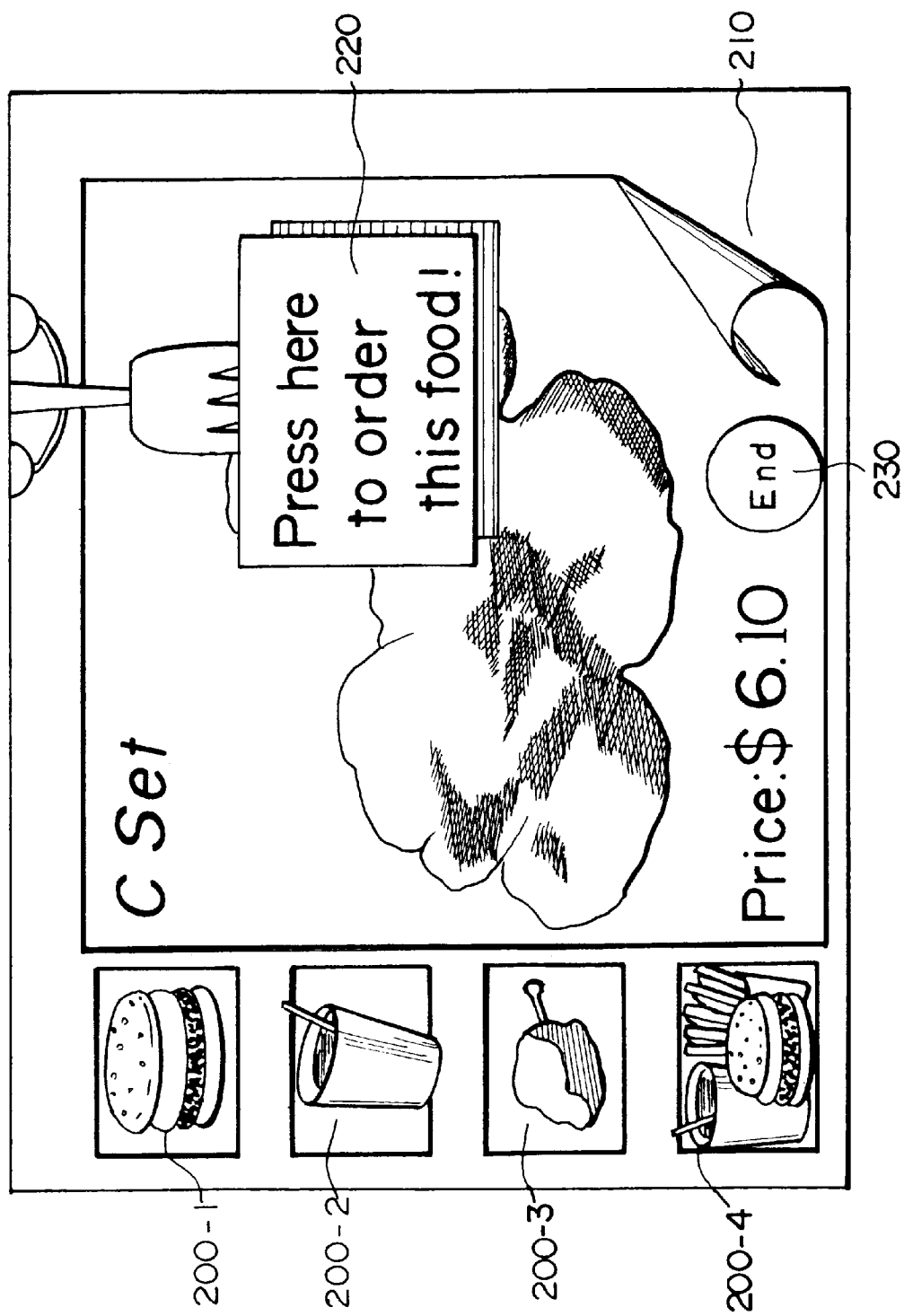
FIG. 11 is yet another explanatory view of the order screen of the order-taking terminal device.

If the customer orders chicken in step 112, the menu shown in FIG. 11 appears on the display screen 42 (step 114-2) so that the customer can selected a desired chicken dish from a number of chicken menu screens in a similar manner to that described above.

In this manner, a food such as a burger or chicken is selected and ordered. To make a further order at the same time, such as that of a beverage such as coffee or another item, the customer can touch another order area 200 on the menu screen shown in FIG. 10 or 11 to select it. This enables the customer to combine a number of orders (step 118).

Once a sequence of orders has been completed in this manner, the customer touches a computation button display area 230 that is displayed on each menu screen as shown in FIGS. 10 and 11.

This changes the flow in FIG. 3 from the menu screen display processing step 110 to a confirmation screen display step 120, and a list of the products ordered and the total bill appears on the screen together with selection buttons for additional orders, cancellation, and order-confirmation.

Once the customer has checked that this order is correct, by looking at this confirmation screen, he or she touches the order-confirmation (OK) button.

This causes the order data to be sent from this order-taking terminal device 40-1 via the RF transceiver unit 48 to the on-site POS system with main management equipment 10, where it is written to the memory 28 in the host computer 20 (step 130).

When this data transfer has ended (step 140), the order-taking terminal device 40 returns to the idle state (step 100) of FIG. 3 and starts the previously described process of inducing orders.

A flowchart of the operations of the on-site POS system 10 is shown in FIG. 5.

When the order management system starts up (step 160), it communicates with the head-office host computer (step 162) to receive various items of data relating to the day's menu, and it also receives an operating program 1000 and image data 1002 for order screens for use by the order-taking terminal devices 40-1, 40-2 and writes them to the memory 28 in the on-site POS system.

Subsequently, the on-site POS system with main management equipment 10 sets and stores the new operating program 1000 and image data 1002 in the order-taking terminal devices 40-1, 40-2 on the tables 30-1, 30-2 within the restaurant, by sending the operating program 1000 and image data 1002 for order screens that are stored in the memory 28 to the terminal devices 40-1, 40-2 (step 164).

This enables the order management system of the present invention to respond flexibly to additions and modifications to the menu, since the operating program 1000 and image data 1002 are distributed to the order-taking terminal devices 40-1, 40-2 as appropriate when the system starts up.

Subsequently, the on-site POS system with main management equipment 10 is controlled in the idle state (step 168), it can communicate with the head-office host if necessary (step 170), and it can also perform register processing such as sales management with the register 24 (step 172).

While the system is in this idle state (step 168), if order data is received from any order-taking terminal device 40-1, 40-2 (step 174) in the manner described above, the flow proceeds to the step of processing that order (step 176). If this is a fast-food restaurant, register processing (step 178) is performed immediately after the processing of step 176, then a list of the products ordered together with the total price is printed out (step 180). If this is an ordinary restaurant, this printout is processed (step 180) after the order has been processed (step 176).

In this manner, the on-site POS system 10 is designed to accept orders from the order-taking terminal devices 40-1, 40-2 within the restaurant and also perform the appropriate register processing.

When the products that have been ordered have been prepared, the restaurant staff use the input-output terminal device 22 to input an order-ready message, whereupon that message is sent by wireless means from the on-site POS system 10 to the appropriate order-taking terminal device 40-1, 40-2, causing an indication to appear on the screen of that order-taking terminal device 40-1, 40-2. This enables the customer to determine immediately that the ordered food is ready and can be picked up. Therefore, an order management system can be implemented in such a manner that both customers and staff find it extremely convenient to use, since customers can relax in their own seats during the time between the placing of each order and when the food is ready, and thus do not have to wait in line to order and pick up their food.

A particularly preferable configuration of the system of this embodiment is such that data transferred interactively between the order-taking terminal devices 40-1, 40-2 and the on-site POS system with main management equipment 10 (such as ordering data sent from a terminal device 40-1, 40-2 to the POS system 10 and message-display data sent from the POS system 10 to each of the terminal devices 40-1, 40-2) is transferred as coded data. This makes it possible to reduce the amount of interactive data that is transferred and thus enable efficient data transfer.

The system of this embodiment also causes a cartoon character such as Mr. Fork 300 to appear within each menu screen so that information necessary to the user can be conveyed in an easy-to-understand form. In other words, the provision of this animated cartoon character makes it possible to convey to the user details such as the contents of each item in the menu screens and how to operate these menu screens, in a visually comprehensible form.

Second Embodiment

A second embodiment of the present invention will now be described in detail.

The first embodiment of the present invention was described by way of example as being applied only to the order management of a food menu in a restaurant. This second embodiment, however, is characterized in that it is configured to provide order management of information, not just of the food menu in the restaurant.

In other words, the system of this embodiment is characterized in that image data 1002 and an associated operating system 1000 for the order management of a food menu are stored in the memory 28 of the on-site POS system with main management equipment 10 of FIG. 1 together with image data 1002 and an associated operating system 1000 for the order management of information. When this system starts up, a plurality of sets of image data 1002 and operating programs 1000 are sent from the on-site POS system 10 to the terminal devices 40-1, 40-2, and the transferred data is written into and stored in the receive data storage section 54 of each of the order-taking terminal devices 40-1, 40-2.

Figure 15:
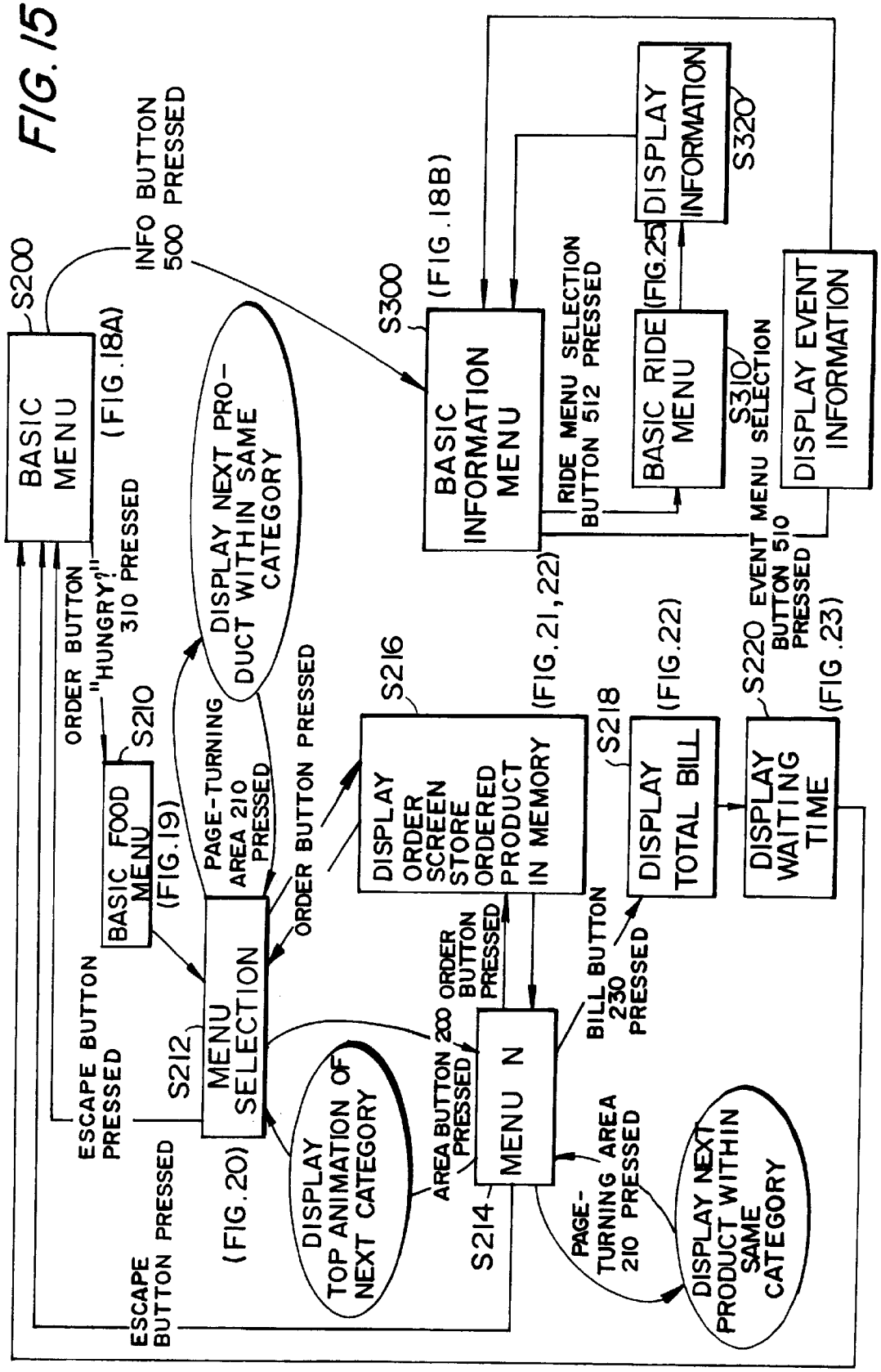
FIG. 15 is a flowchart of the operation of the order management system of the second embodiment of the present invention.

An outline of the operation of each terminal device 40-1, 40-2 is shown in the flowchart of FIG. 15.

Figure 18A:
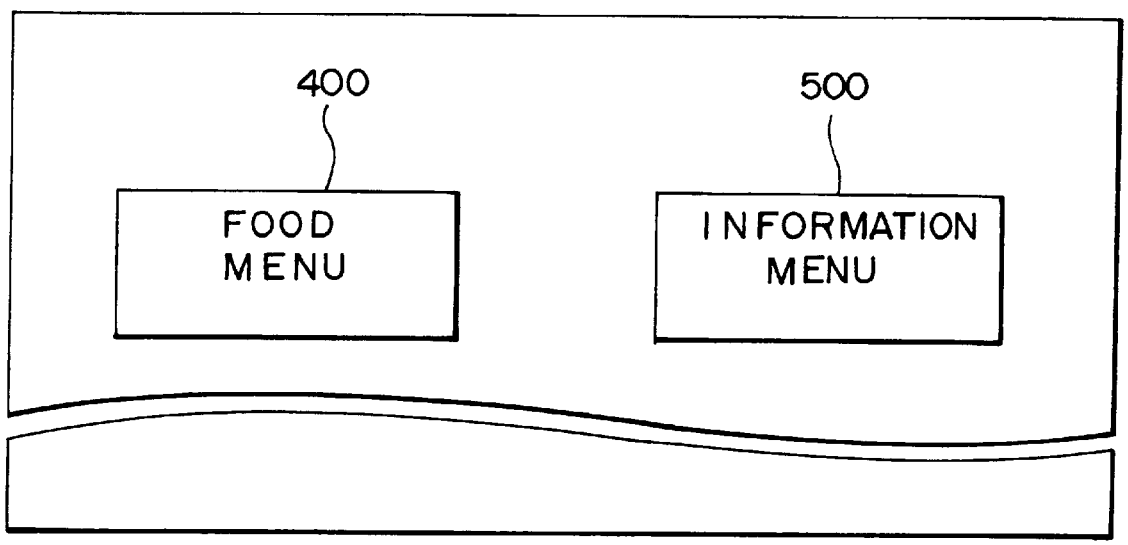
FIGS. 18A and 18B are explanatory views of a basic menu screen and a basic information menu screen of the second embodiment, respectively.

First of all, when the system has started up and the transfer and writing of the image data 1002 and operating programs 1000 from the POS system 10 to the order-taking terminal devices 40-1, 40-2 has ended, a basic menu screen such as that shown in FIG. 18A appears on the display screen 42 of each of the order-taking terminal devices 40-1, 40-2 (step S200).

A food menu selection button 400 and an information menu selection button 500 are displayed on this basic menu screen, with a transparent touch-sensitive panel 44 positioned over each display area.

Figure 19:
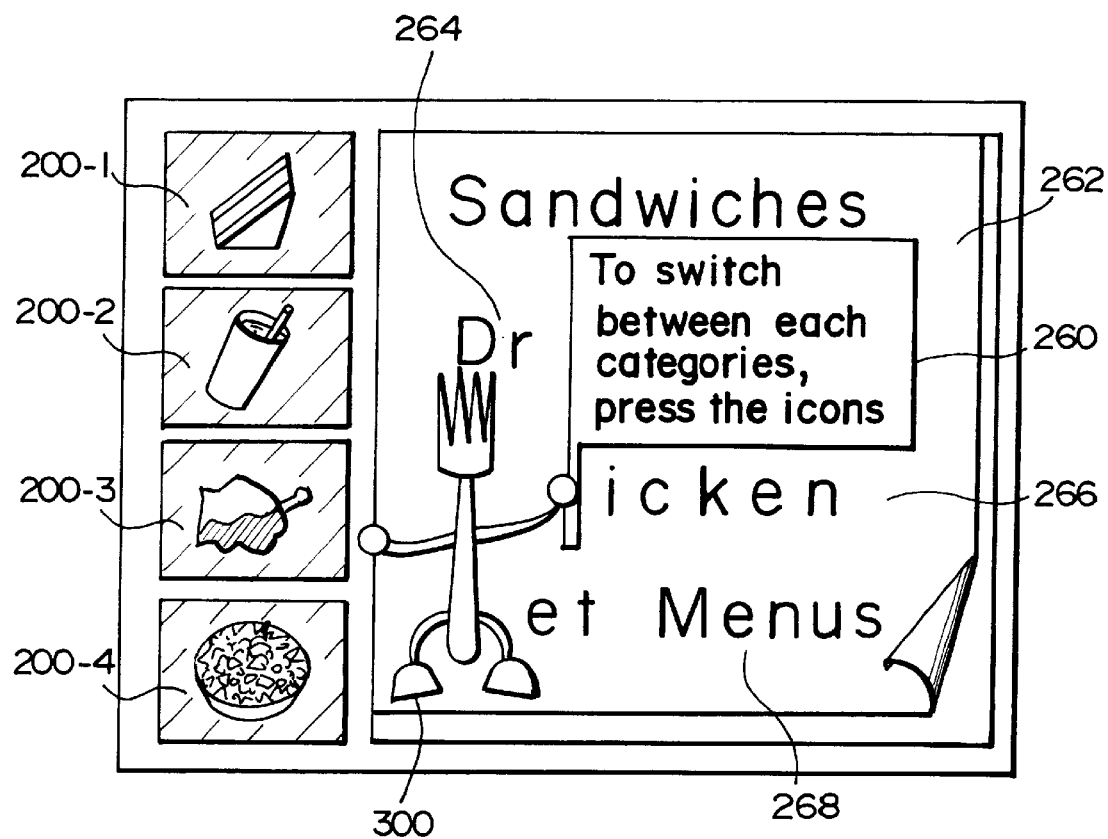
FIG. 19 is an explanatory view of a basic food menu screen.

If a customer sitting at one of the seats in the restaurant views the display screen of the terminal device 40 provided at that table and touches the food menu selection button 400 with a finger, a corresponding input signal is input to the CPU 50 from the touch-sensitive panel 44. This causes a predetermined instruction to be sent from the CPU 50 to the image processing IC 56, the image processing IC 56 calls up image data from the receive data storage section 54 on the basis of this instruction, and the basic menu screen for food is displayed as shown in FIG. 19 (step S210).

A row of major list categories 200-1 to 200-4 of products that can be ordered from the food menu is displayed on the left side of this basic menu screen. Icons are displayed as animated or photographic images in the display areas for these categories 200-1 to 200-4, to act as an instantly recognizable index to the contents of these categories (such as sandwiches, beverages, chicken dishes, and salads).

Written captions 262, 264, 266, and 268 of each of the categories are displayed beside each category in the main part of the screen to the right of these categories 200-1 to 200-4. These written captions 262 to 268 are arranged in such a manner that "Sandwiches" is displayed for category 200-1, "Drinks" for category 200-2, "Chicken" for category 200-3, and "Salads" for category 200-4.

A dynamic cartoon character 300 is also displayed in such as manner as to partially overlay the written captions 262 to 268, and a sign 260 held by this cartoon character 300 bears the written notice: "To switch between each category, press the icons."

To request menus that are not currently displayed, the customer can touch the area of the sign 260 to display the next page of the menu which is a screen of the same configuration as that of FIG. 19.

It should be noted that parts of the written captions 262 to 268 that are overlaid by the cartoon character 300 and the sign 260 ("Drinks" and "Chicken" in this figure) will be obscured if the character stays in a fixed position without moving. Therefore, the cartoon character 300 and the sign 260 are make to move in a circuit up and down the screen, to made hidden captions visible. This enables efficient use of a limited display area.

From consideration of the size of the display screen and size of area that a user can be expected to touch easily, it is preferable to display about four items per screen as the major categories 200-1 to 200-4 of the food menu. Each of these categories 200-1 to 200-4 also functions as an icon, and information relating to a category is displayed on the screen when the user touches the associated icon.

Figure 20:
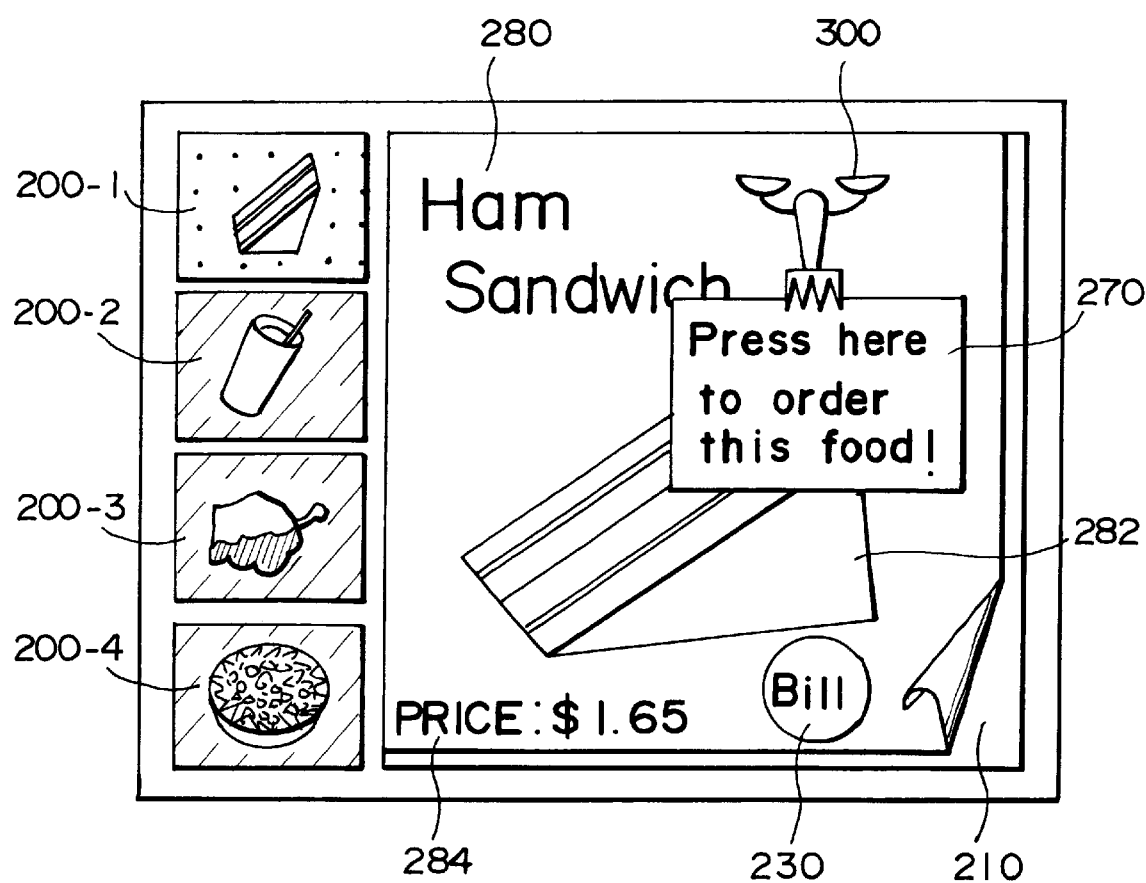
FIG. 20 is an explanatory view of a menu selection screen.

For example, if the user touches the sandwich category 200-1, a menu screen similar to that of FIG. 20 is displayed. Note that the category 200-1 that is currently selected is displayed with a different background color within its frame, to distinguish it from the other categories 200-2 to 200-4. More specifically, all of the categories 200-1 to 200-4 have the same background color (represented by hatching in this figure) before any selection is made (the state shown in FIG. 19). However, if category 200-1 is touched, the color of that category 200-1 changes (represented by a dotted pattern in FIG. 20) while the color of the other categories 200-2 to 200-4 remain the same. This process of having a different color within the frame of a specified category can work equally well in reverse so that the selected category 200-1 remains the same color, but the color of the other categories 200-2 to 200-4 is changed.

Note that FIG. 20 shows the display that appears when the sandwich category 200-1 is specified, in which case an animated image 282 of a ham sandwich that is representative of the selected category 200-1 is displayed in the area to the right of the figure. At the same time, a written caption 280 giving the product name "Ham Sandwich" and another written caption 284 giving the price are also displayed in addition to the animated image 282 of the ham sandwich. The cartoon character 300 is also displayed on this screen, together with a sign 270 on which is written "Press here to order this food." A computation button 230 on which is written "Bill" is also displayed on the screen, to prompt computation of the bill. If the user wishes to order, he or she touches the area of the sign 270 and then touches the computation button 230.

Figure 17:
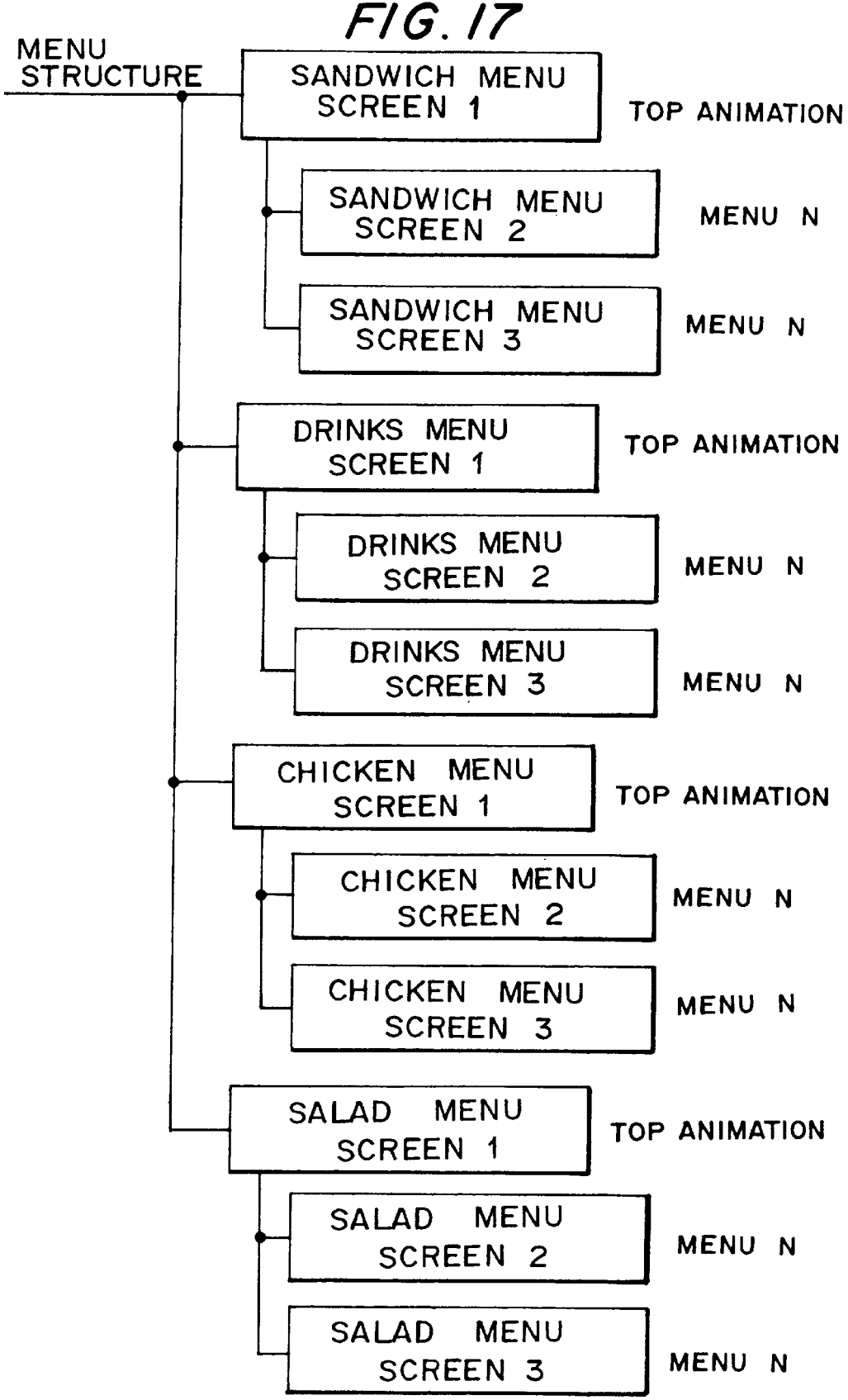
FIG. 17 is an explanatory view of the menu structure of the second embodiment.

The menu structure of these categories 200-1 to 200-4 is shown in FIG. 17. Taking the sandwich menu as an example, the configuration is such that there are three menu screens, one for each of three different types of sandwich. The first menu screen could display a salad sandwich; the second menu screen, a ham sandwich; and the third menu screen, an egg sandwich, for example. Similarly, a number of menu screens are configured to display details of each of a number of different choices in the other categories, such as drinks, chicken dishes, and salads.

If the sandwich category 200-1 has been selected and the user then touches the sign 270 shown in FIG. 20, a display screen for selecting a number of orders (not shown in these figures) appears so that the user can input a number of orders while viewing this screen. More specifically, if the user presses the specified portion 270 in accordance with the instruction "Press here to order this food," the written caption "Press here to order this food" within the sign 270 could change to show numeric keys 0 to 9 that the customer could use to input a number of orders.

Figure 21:
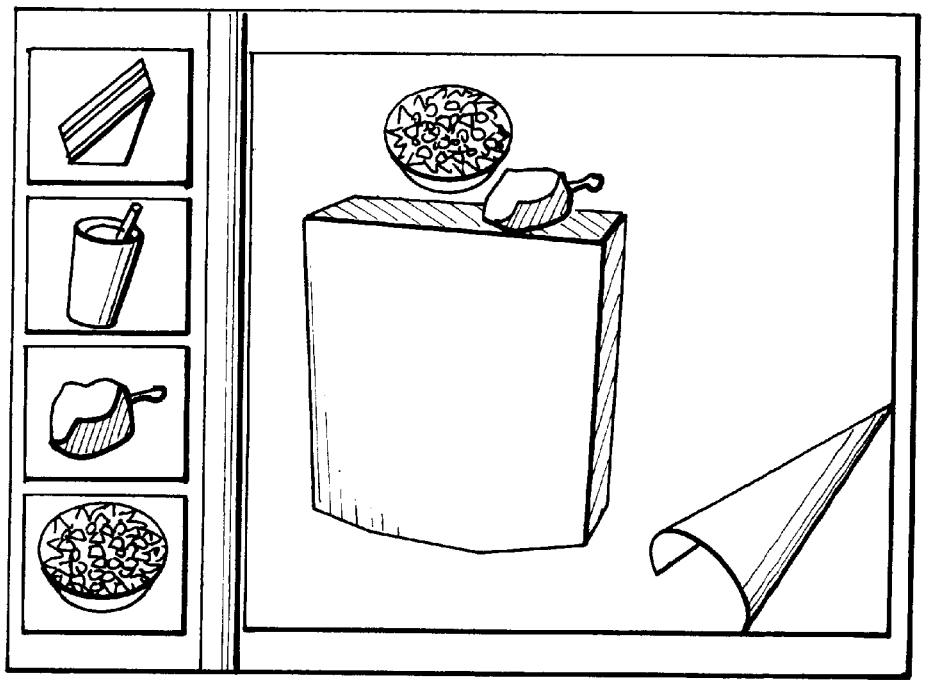
FIG. 21 is an explanatory view of an order screen.
Figure 22:
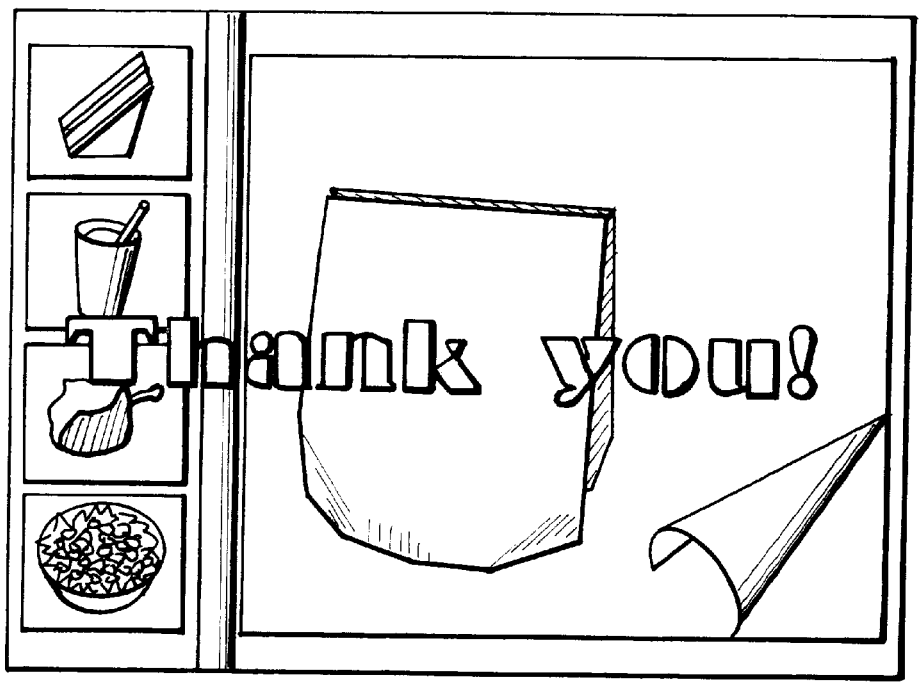
FIG. 22 is another explanatory view of an order screen.

If the customer uses this function to order a predetermined number of ham sandwiches, for example, a series of animations could appear to show the products that have been ordered in a package to go, as shown in FIGS. 21 and 22 (step S216). This enables the user to verify the details of the order visually.

At the point at which the products that have been ordered are shown accommodated within a package, as shown in FIG. 22, a "Thank you" message appears on the screen, then the display returns to the menu selection screen of FIG. 20 (steps S212 and 214).

A user that does not want a ham sandwich could press the page-turning area 210 provided at the bottom right corner of the display screen, whereupon an animated image of a salad sandwich, for example, is displayed instead of the currently displayed ham sandwich. If the page-turning area 210 is pressed again while the salad sandwich is being displayed, another type of sandwich is displayed in sequence, such as an egg sandwich.

In a similar manner, if the category 200-2 was selected, an animated image of a beverage such as orange juice appears first, together with an appropriate written caption, (step S214). If the user doesn't want orange juice and presses the page-turning area 210 provided at the bottom right of the display screen, an animated image of a different type of juice is displayed as second information. Pressing the page-turning area 210 again when this image is displayed causes the next beverage to be displayed, and thus a number of beverages can be displayed one-by-one in sequence.

Figure 23A:
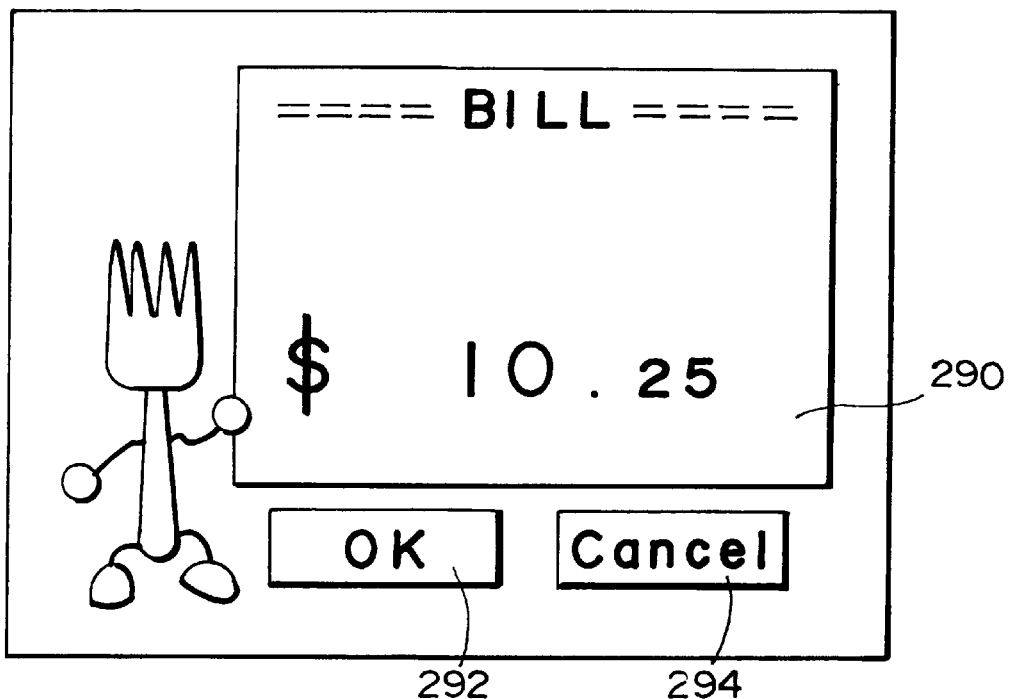
FIGS. 23A and 23B are explanatory views of a total charge screen and waiting time display screen, respectively.

In this way, the user orders the desired items of food (steps S212, S214, and S216). Once this sequence of orders is completed, the user touches the computation button 230 that is displayed in a manner such as that shown in FIG. 20. This causes a total charge screen such as that shown in FIG. 23A to appear on the display screen 42 (step S218). A written caption 290 indicating the total bill for the products that the user has ordered, an OK button 292, and a cancel button 294 are displayed on this final-total screen. The user then touches the OK button 292 to agree to the bill for this order, or the cancel button 294 to correct the order.

Figure 23B:
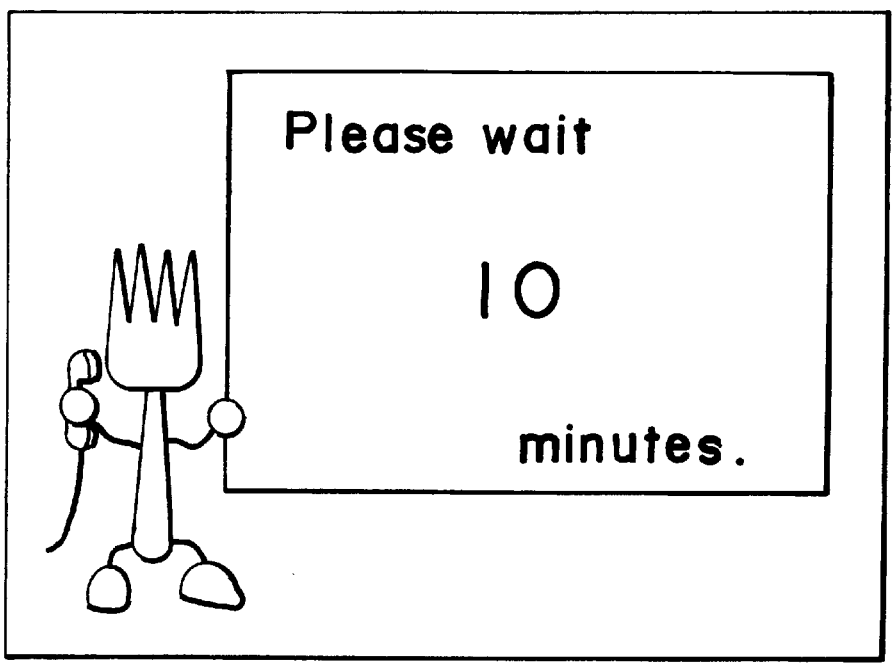

If the OK button 292 is touched, the ordering sequence ends and details of the order (information such as the food name, number of items, total bill, and table number) are sent as code data from the terminal device 40 to the host computer 20 of the POS system 10. The waiting time required until the ordered products will be ready is sent back to that terminal device 40 from the host computer 20 as code data. The time until the ordered food is ready is displayed on the display screen 42 of the terminal device 40 as shown in FIG. 23B (step S220).

When this sequence of processing ends, the flow returns to step S200 and the basic menu screen reappears on the display.

Figure 16:
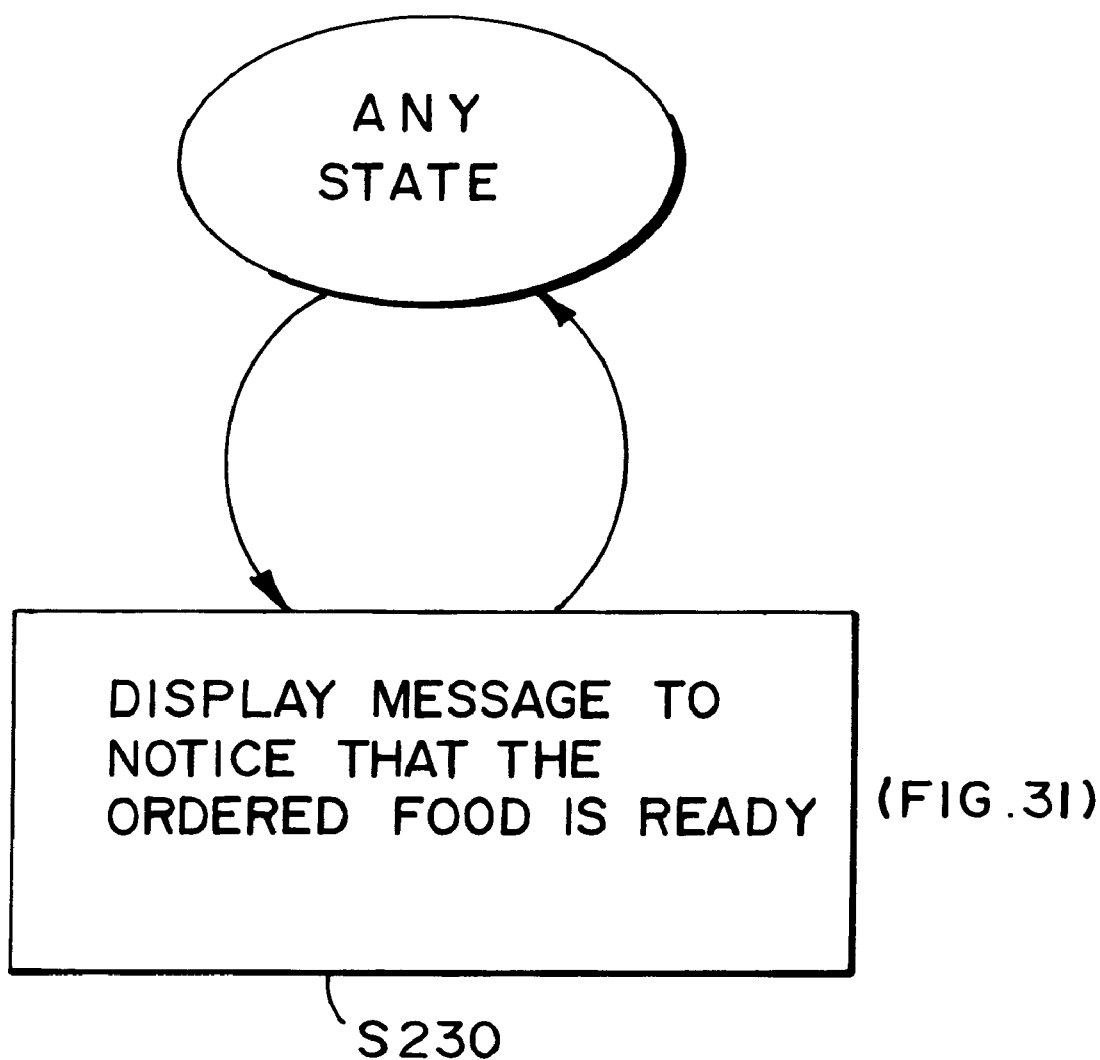
FIG. 16 is a flowchart of the order-ready interrupt operation of the second embodiment.
Figure 24:
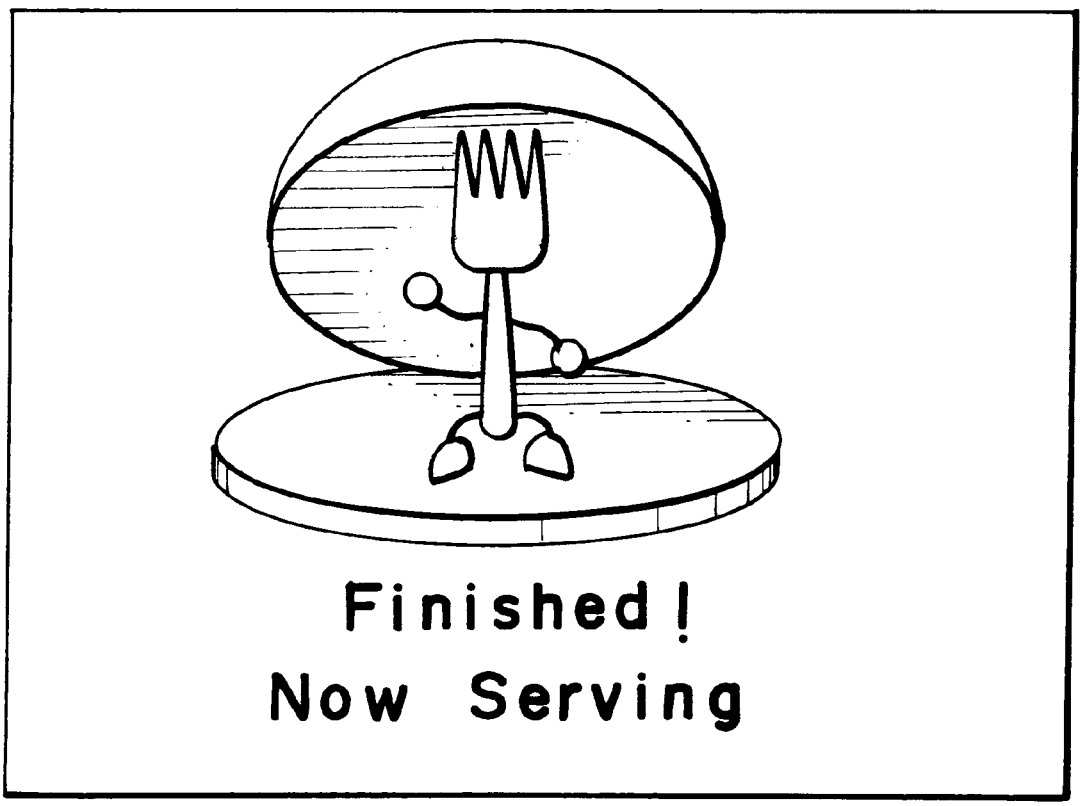
FIG. 24 is an explanatory view of an order-ready message screen.

When the food that the user has ordered is ready, an interrupt is sent from the on-site POS system 10 to the user's order-taking terminal device 40, as shown in FIG. 16, and a message saying that the ordered food is ready is sent as code data. When it receives this code data, the terminal device 40 displays a food-ready message such as that of FIG. 24 on the display screen 42 (step S230). This sends an interrupt to the display screen 42 to display a food-ready message, making it possible for the user to be informed accurately that the ordered food is ready, even if the user has selected another screen and the associated operations are being performed, as will be described later.

Note that if the cancel button 294 is touched in step S218, the menu selection screen of FIG. 19 returns to the screen, enabling the user to start the ordering process from the beginning.

Note also that the system of this embodiment is configured in such a manner that, once the ordering from the food menu has ended, the waiting time required until the food is ready can be used to present various items of information about the amusement park, from the basic menu screen displayed on the display screen 42 (step S200). To see this information in such a case, the user touches an information menu selection button 500 from the basic menu screen shown in FIG. 18A.

Figure 18B:
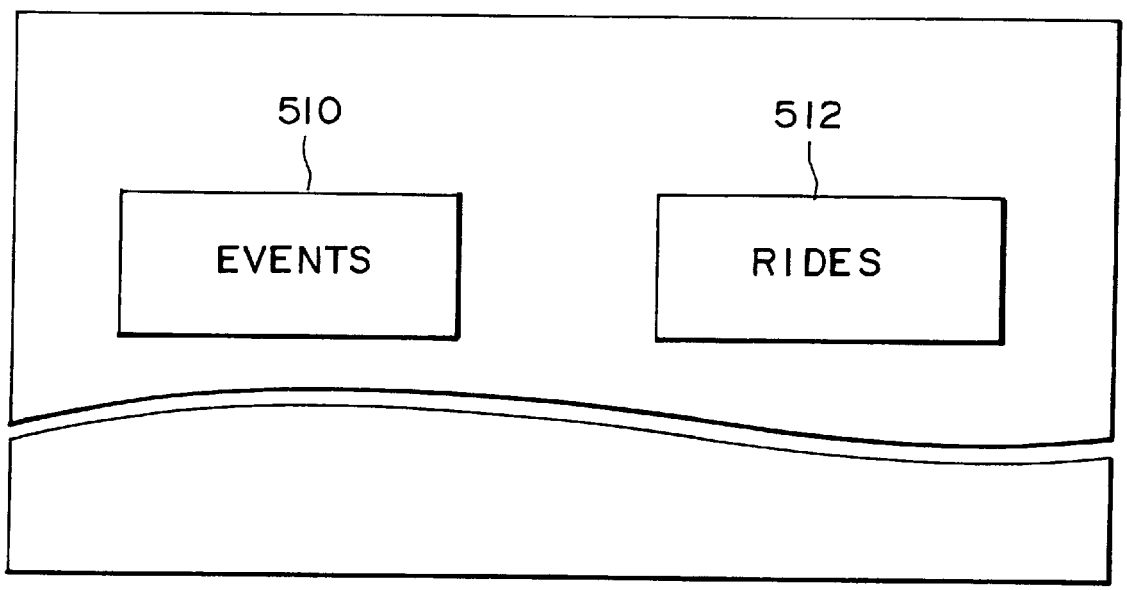

This causes a basic information menu screen to appear on the display screen 42, as shown in FIG. 18B, and also causes audible instructions for operating this basic menu screen to be output from the speaker 46 (step S300).

An event menu selection button 510 and a ride menu selection button 512 are displayed on this basic menu screen.

Figure 25:
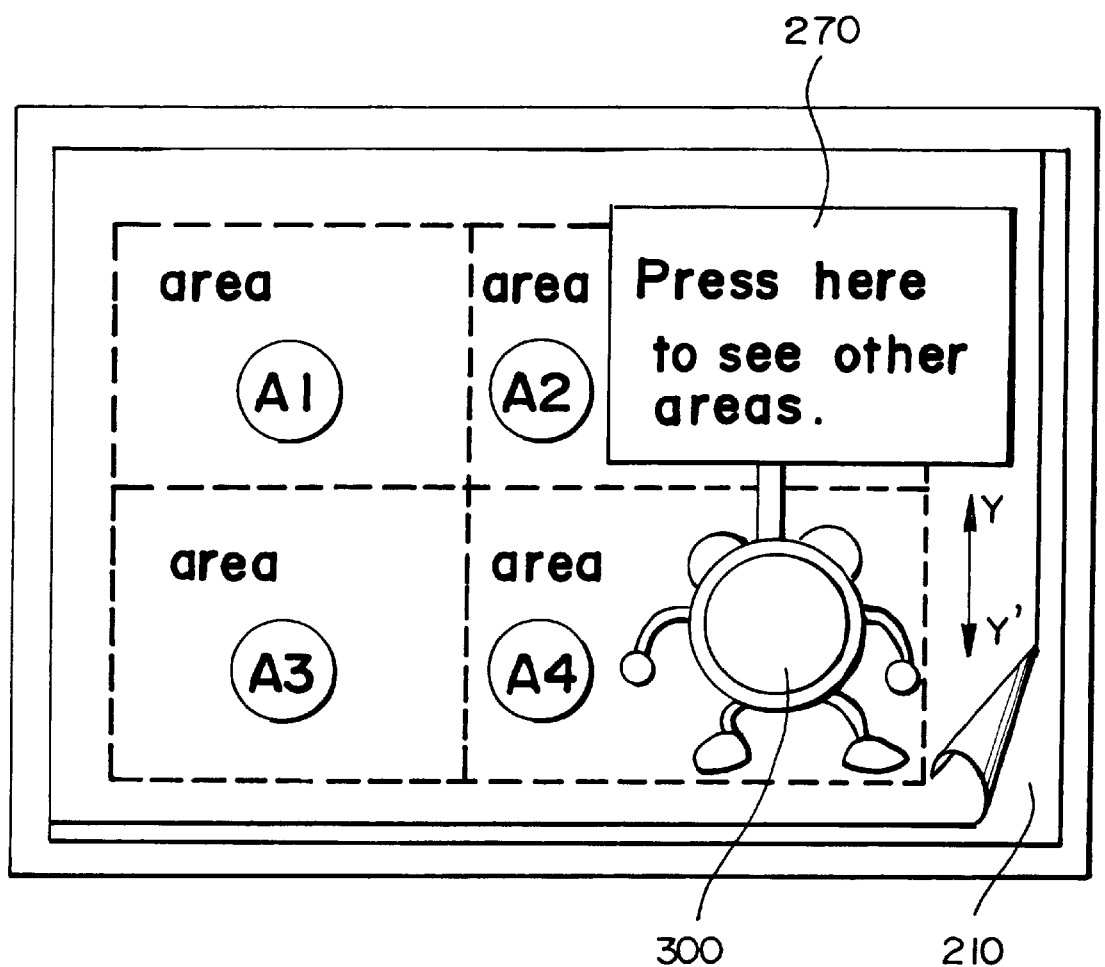
FIG. 25 is an explanatory view of a basic ride menu screen.

If the user touches the ride menu selection button 512, a basic ride menu screen appears on the display screen 42, as shown in FIG. 25 (step S310).

This basic ride menu screen displays four areas, a first area A1 to a fourth area A4, to represent areas A1 to A4 within the amusement park. In this case, each of the areas displays a simple animated image of a typical ride within that part of the amusement park, such as a roller coaster in area A1 and a Ferris wheel in area A2 (however, these animated images are omitted from the figure). In addition, a cartoon character 300 appears in such a manner as to overlay this area information. A sign 270 held by this cartoon character 300 has a written caption saying "Press here to see other areas," in a similar manner to that of the food menu. To see an area that is not displayed on this screen, the user touches the sign 270 and the next page of information (on four areas from A5 onward) is displayed with the same screen structure. Note that parts of the displayed information that is overlaid by the cartoon character 300 and the sign 270 will be obscured if the character stays in a fixed position without moving, so the cartoon character 300 and the sign 270 are made to move in a circuit along the path Y–Y', to made hidden captions visible. This enables efficient use of a limited display area.

In the same manner as with the food menu, the amount of area information displayed at a time is preferably enough for four areas within one display screen, as shown in FIG. 25, from consideration of the size of the display screen and size of area that a user can be expected to touch easily. Since each of these areas A1 to A4 also functions as an icon, details associated with an area are displayed on the screen if the region of that area is touched. For example, if the region of area A1 is touched, the display shown in FIG. 26 could appear (step S320). Note that the color of the background portion within the frame of the specified item (area A1, in this case) could be made to be different from the color of other items, in the same manner as with the food menu.

Figure 26:
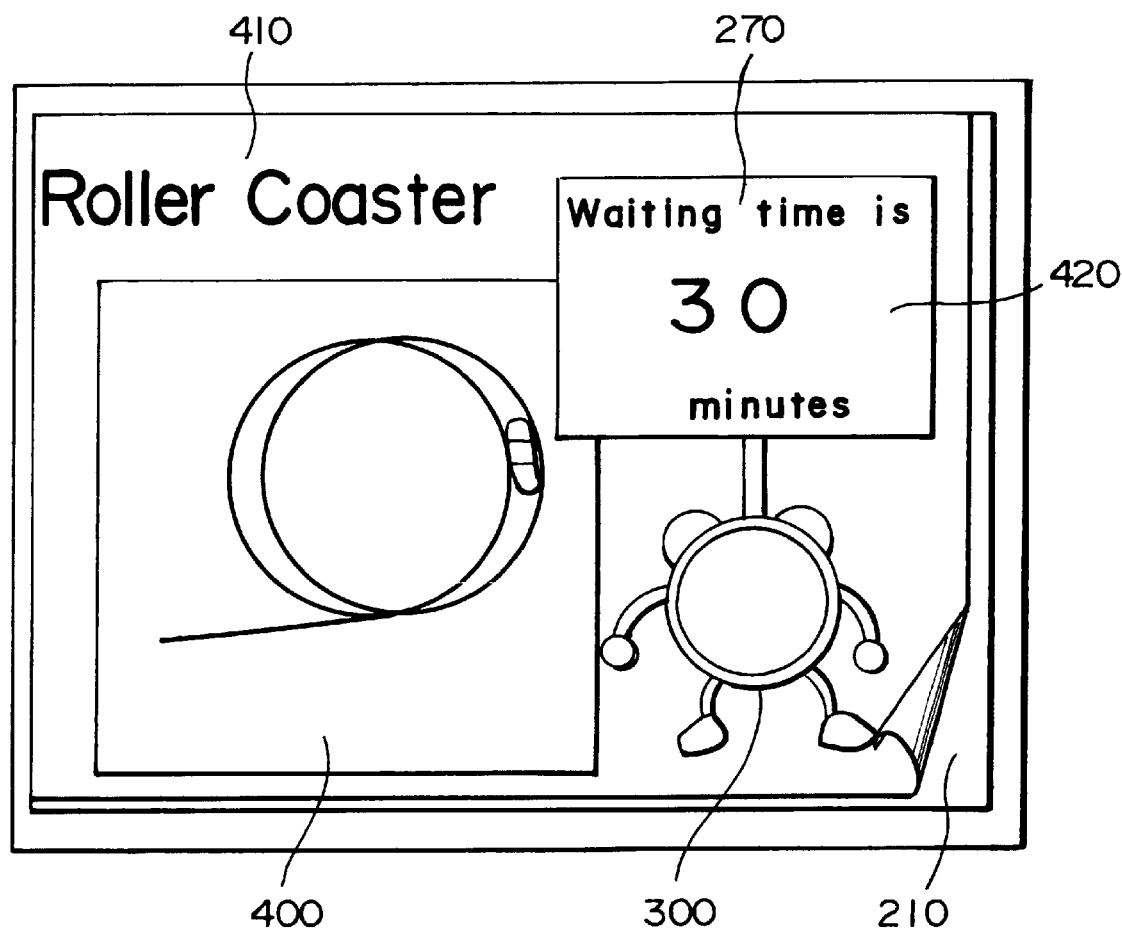
FIG. 26 is an explanatory view of a display screen for ride information.

Note that FIG. 26 shows the display that appears when area A1 is specified, in which case an animated image that expresses the concept of a roller coaster is shown on the screen in an easy-to-understand form. In addition to an animated image 400 of a roller coaster, the screen also shows a written caption 410 saying "Roller coaster" and another written caption 420 expressing the waiting time as "Waiting time is 30 minutes," together with the cartoon character 300. If the user presses the page-turning area 210 provided at the bottom right of the display screen, an animated image of another ride within the same area A1 is displayed instead of the currently displayed roller coaster. Every time the user presses the page-turning area 210 of the animated image representing a newly displayed ride, animated images of other rides within the same area are displayed one at a time in sequence.

The above description concerned a case in which information relating to the food menu and attractions at an amusement park are displayed, but the present invention can equally well be applied to a case in which a similar method is used to display "Event information" and "Other information" (not shown in the figure). If a user touches a major category such as "Event information" or "Other information" in such a configuration, animated images relating to about four items are first displayed to act as an index of the information belonging to that major category. If any one of those four categories is pressed, a first animated image belonging thereto is displayed. If there is another item available within this category, pressing the page-turning area 210 causes a similar second animated image to be displayed, pressing the page-turning area 210 again causes a similar third animated image to be displayed, and so on until all the images have been displayed in sequence by screen switching. Note that the display method in this case is substantially the same as that of the display of the food menu or attractions, so further description thereof is omitted.

In this manner, this embodiment of the invention makes it possible for an order entry system at a restaurant or similar site to display large quantities of multimedia information efficiently within a limited display space, and also display that information in a form that is easy for a user to understand. It also enables the user to perform the input operation easily, based on displayed information.

Figure 14:
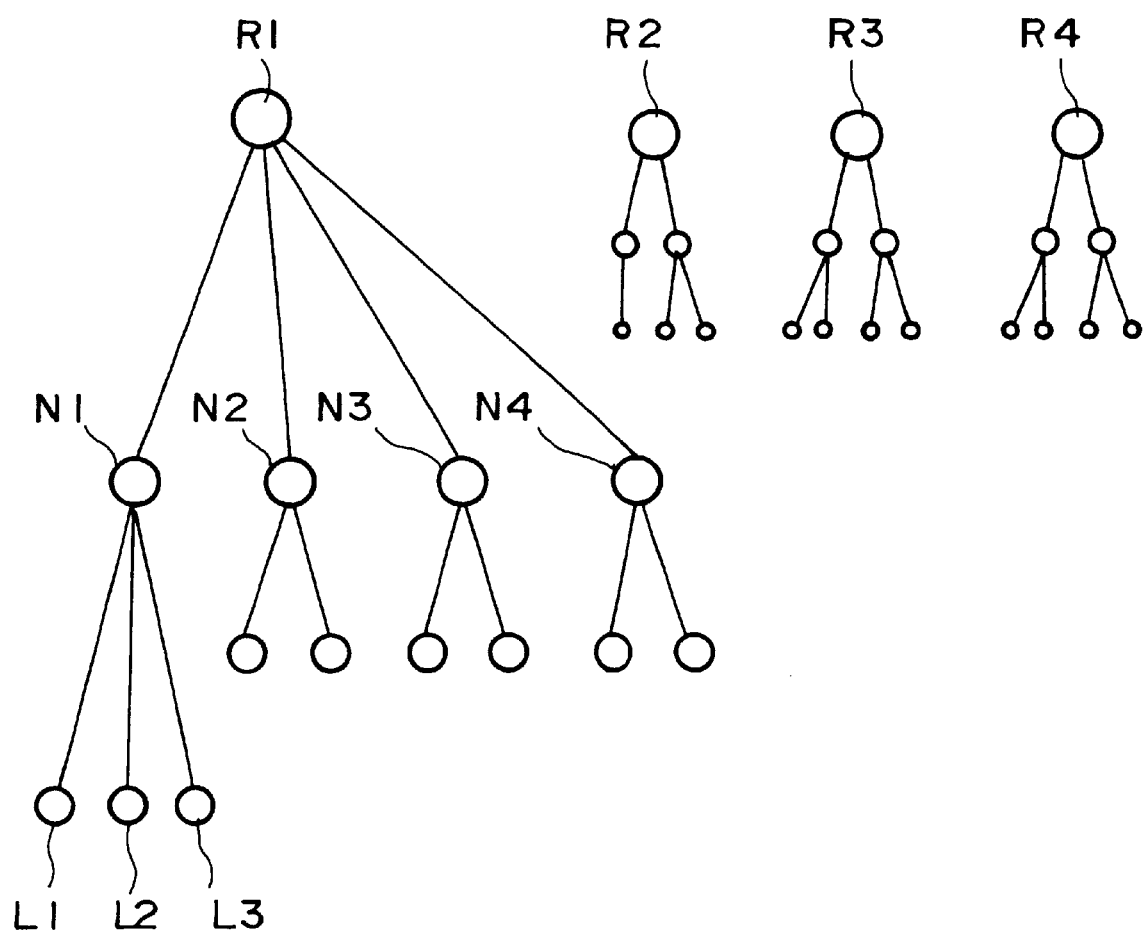
FIG. 14 is an explanatory view of the operation of the tree structure of hierarchical menu screens used in the system.

An example of the structure of hierarchical menu screens that are displayed in this manner is shown in FIG. 14.

In this structure, a plurality of items of multimedia information to be displayed is divided into a number of major categories, one for each type of information, and information within each of these categories is arranged in a tree structure belonging to that category. If one item of information in a hierarchical level corresponding to a root or node of this tree structure is selected, information in the next level belonging to the thus selected information is displayed. If there is a plurality of items of information to be displayed, the selection of one item of this information ensures that the display of information in the next level belonging to the selected information is processed in sequence. At the leaf level of the tree structure, a plurality of items of information corresponding to the selected leaf are switched to display one at a time.

If, for example, roots R1, R2, R3, and R4 in the tree structure of FIG. 14 are made to correspond to the above described second embodiment, root R1 would correspond to "Food menu selection", root R2 to "Event information", root R3 to "Attraction information", and root R4 to "Other information." Note that, in order to simplify the description below, only "Food menu selection" is discussed. Nodes N1, N2, N3, and N4 belonging to root R1 "Food menu selection" correspond to major categories 200-1 to 200-4 of the food menu in this case, as shown in FIG. 19. Similarly, leaves L1, L2, . . . belonging to node N1 of category 200-1, for example, correspond to different types of sandwich in this case, such as ham sandwich and salad sandwich.

The use of a display method of this type makes it possible to display a large quantity of varied information in an easily recognizable form, even if the screen can only display a small amount of space at a time. Since the image information that is displayed is animation information (mainly dynamic images, but a static image could also be used), information that the management particularly wants to attract the user's attention could be made more noticeable by making only the attention-attracting portion a dynamic image, or it could be made even more recognizable by various other contrivances. From the recognizability point of view, it is also preferable that the entire screen is used to display each type one-by-one, to make the images seem bigger. Note that a plurality of images could equally well be displayed simultaneously, within a range in which recognizability is not affected.

With this embodiment, the configuration is such that various types of animation information (image data) to be displayed are stored in the receive data storage section 54 provided in the terminal device 40-1, 40-2, the user requests information from the touch-sensitive panel 44, and animation information is read out from an address corresponding to the input from the touch-sensitive panel 44. However, the configuration could be such that information other than this preset animation information is sent from the host computer 20 to each terminal device 40-1, 40-2 at fixed intervals. This information could relate to the waiting times for rides or the starting times of events, or it could be information that changes with time such as news about lost property or straying children. The CPU 50 could accumulate the information sent from a central location as latest information in the memory 54 and display it as required.

In this manner, the system of this embodiment is configured in such a manner that animation image data that involves a large quantity of data that would require a long wait to transfer is held within the terminal device, and only information such as that which requires a short wait to transfer or numeric information is transferred to and from the host computer. Moreover, accumulating data from the host computer in the memory of the terminal device ensures that there is normally no need to receive data from the host computer. Thus the system of this embodiment is characterized in that it can be implemented even with an inexpensive network that can transfer only a small quantity of data.

It should be obvious to those skilled in the art that the above described embodiments are merely examples of the application of the present invention, and should not be taken as being limiting. For example, the major categories of this embodiment were specified as being "Food menu selection," "Event information," "Ride information," and "Other information." However, software such as various games could also be incorporated into the system. If the user touches a category of "Games," major categories of a number of games appear and the user can then select a preferred game from amongst these options.

In addition, although the above embodiments concerned examples in which the present invention was applied to order management in a restaurant, it should be obvious that the present invention is not limited thereto and various other embodiments can equally well be applied to other environments.

For example, the order-taking terminal devices 40 shown in FIG. 1 could be disposed at customers' seats at a sports ground such as a baseball stadium or soccer stadium, with the POS system 10 being located at a central product distribution center. The configuration could be such that, when an order is received from one of the order-taking terminal devices 40, the operator of the POS system 10 instructs the nearest vendor to that customer's seat to deliver the ordered products.

The order management system of the present invention is not necessarily applicable to a baseball stadium as described above; it can equally well be applied to another place of entertainment such as a theater. In such a case, the ordering of products from customers' seats in the theater can be facilitated by the provision of an order-taking terminal device at each of the customer's seats.

The order management system of the present invention is not limited to food and beverages in a restaurant as was described above, it can equally well be applied to the ordering of data relating to a popular player or actor in an entertainment site such as a sports ground, baseball stadium, or theater.

In such a case, the ordered data is preferably transmitted by radio from the POS system 10 to the corresponding terminal device 40, and it displayed on the display screen 42 of the terminal device 40.

In addition, if the present invention is applied to an entertainment site such as a baseball stadium or theater, it is not essential to display a menu screen when the system starts up. Advertising images could be displayed on each of the order-taking terminal devices by configuring the system in such a manner that data such as image data for predetermined advertisements is transmitted from the main management equipment to the order-taking terminal devices. This enables the system to respond rapidly to changes and additions to advertisements from sponsors, as well as to changes in the ordering menu.

The above embodiments were also described by way of example as relating to a system in which the on-site POS system and the order-taking terminal devices were connected by wireless circuitry, but they could equally well be connected by cables if necessary.

What is claimed is:

1. A method of operating an order management system including a main management equipment for order management and a plurality of terminal devices connected to said main management equipment by lines, said method comprising:

storing in said main management equipment image data for an order management screen created for at least one of said terminal devices and an operating program for reproducing said image data in accordance with predetermined rules and managing data transmission for order management;

transmitting said image data and said operating program to at least one of said terminal devices upon a system start-up;

storing said image data and said operating program in said at least one terminal device;

reading said image data based on said operating program and displaying an order management screen on said terminal device;

receiving an order on said terminal device in response to display of said order management screen and transmitting said order to said main management equipment; and wherein said step of displaying an order management screen comprises displaying a hierarchical menu screen representing a plurality of ordering categories; and wherein said image data includes information divided into a number of major categories according to type, items belonging to each of said major categories further divided into a tree structure within each said major category, so as to display order management menu screens in a hierarchy; and displaying a menu screen representing items in a level next to a hierarchical level corresponding to one of a root and node portion of a displayed tree structure, said next level belonging to a category selected by a user from categories of said hierarchical level, receiving a screen changing order and switching menu screens representing each of items belonging to a leaf portion of said tree structure to display a menu screen; and wherein display contents of each item belonging to a hierarchical level corresponding to said one of root and node portions comprises an image representing contents of said item, at least part of said image comprising an icon; and selecting an icon and displaying a menu containing an item corresponding to said selected icon; and displaying said selected icon distinctly from at least one non-selected icon;

displaying a display change area on a screen, selecting said display change area, and switching from an image being displayed so as to display different items corresponding to a leaf portion of said tree structure; and displaying explanatory information overlaid on display information, and moving said explanatory information to reveal said display information.

* * * * *